(12) United States Patent
Okumura et al.

(10) Patent No.: US 12,104,857 B2
(45) Date of Patent: Oct. 1, 2024

(54) HEAT STORAGE UNIT

(71) Applicant: Tomoegawa Co., Ltd., Tokyo (JP)

(72) Inventors: Katsuya Okumura, Tokyo (JP); Shuhei Hatano, Shizuoka (JP); Ritsu Kawase, Shizuoka (JP); Hideki Moriuchi, Shizuoka (JP)

(73) Assignee: Tomoegawa Co., Ltd., Tokyo (JP)

( * ) Notice: Subject to any disclaimer, the term of this patent is extended or adjusted under 35 U.S.C. 154(b) by 153 days.

(21) Appl. No.: 17/603,425

(22) PCT Filed: Apr. 17, 2020

(86) PCT No.: PCT/JP2020/016959
§ 371 (c)(1),
(2) Date: Oct. 13, 2021

(87) PCT Pub. No.: WO2020/218216
PCT Pub. Date: Oct. 29, 2020

(65) Prior Publication Data
US 2022/0187026 A1    Jun. 16, 2022

(30) Foreign Application Priority Data
Apr. 23, 2019  (JP) ................. 2019-081464

(51) Int. Cl.
*F28D 20/02* (2006.01)
*F28D 20/00* (2006.01)
*F28F 21/00* (2006.01)

(52) U.S. Cl.
CPC ........... *F28D 20/02* (2013.01); *F28F 21/003* (2013.01)

(58) Field of Classification Search
CPC ... D28D 2020/0008; D28D 2020/0013; D28D 2020/0017; D28D 2020/006;
(Continued)

(56) References Cited

U.S. PATENT DOCUMENTS 6,615,906 B1 * 9/2003 Fieback .............. A61F 7/03
 165/10
2010/0116457 A1   5/2010 Oettinger et al.
(Continued)

FOREIGN PATENT DOCUMENTS

EP      0983474 B1    8/2001
GB      2474544 A  *  4/2011   .......... C04B 14/024
(Continued)

OTHER PUBLICATIONS

The extended European search report of the corresponding EP application No. 20794654.2 mailed Dec. 15, 2022.
(Continued)

*Primary Examiner* — Frantz F Jules
*Assistant Examiner* — Jason N Thompson
(74) *Attorney, Agent, or Firm* — Muncy, Geissler, Olds & Lowe, P.C.

(57) ABSTRACT

Provided is a heat storage unit having a simple configuration, capable of being attached to various objects, and capable of efficiently performing heat exchange.
The heat storage unit has at least one inorganic fiber member configured by binding or entangling flexible inorganic fibers and having a desired shape; and
a heat storage material in contact with the inorganic fibers.

3 Claims, 29 Drawing Sheets

(58) Field of Classification Search
CPC ... D28D 2020/0078; D28D 2020/0065; D28D 2020/0082; D28D 2020/0086; D28D 2020/0091; D28D 2020/0095; D28D 20/02; D28D 20/021; D28D 20/026; D28D 20/028; D28D 20/023
See application file for complete search history.

(56) References Cited

U.S. PATENT DOCUMENTS

| | | | | |
|---|---|---|---|---|
| 2011/0179807 | A1* | 7/2011 | Holloway | F24F 5/0017 62/530 |
| 2012/0055661 | A1* | 3/2012 | Feher | F28D 20/021 165/181 |
| 2012/0073226 | A1* | 3/2012 | Biggin | C04B 28/32 52/309.4 |
| 2013/0146000 | A1* | 6/2013 | Choi | F28D 20/028 123/41.14 |
| 2014/0251310 | A1* | 9/2014 | Muren | F28F 13/003 165/157 |
| 2014/0329109 | A1* | 11/2014 | Takewaka | C22C 21/02 428/654 |
| 2015/0241137 | A1* | 8/2015 | France | F28D 20/023 165/10 |
| 2016/0209124 | A1* | 7/2016 | Da Silvaa | C01B 32/16 |
| 2017/0089646 | A1 | 3/2017 | Kawazoe et al. | |
| 2017/0219294 | A1* | 8/2017 | Longis | F28F 3/048 |

FOREIGN PATENT DOCUMENTS

| | | |
|---|---|---|
| JP | S54-011012 B2 | 5/1979 |
| JP | H07-318274 A | 12/1995 |
| JP | 2006-038266 A | 2/2006 |
| JP | 2017-075773 A | 4/2017 |
| JP | WO2015/174523 A1 | 4/2017 |
| WO | 98/53264 A1 | 11/1998 |
| WO | 2008/138990 A1 | 11/2008 |
| WO | 2011/045574 A1 | 4/2011 |

OTHER PUBLICATIONS

International Preliminary Report on Patentability for the corresponding International Application No. PCT/JP2020/016959 issued Sep. 28, 2021, which includes English Translation of Written Opinion of the International Searching Authority for PCT/JP2020/016959 mailed Jun. 30, 2020.

* cited by examiner (A)

(B)

HEAT STORAGE UNIT

TECHNICAL FIELD

The present invention relates to a heat storage unit having a heat storage material.

BACKGROUND ART

A heat storage unit for adjusting various objects such as a semiconductor substrate to desired temperatures is known. The heat storage unit includes a heat storage material, a heat conductive member, a sheet member, and the like (for example, refer to Patent Literature 1). Specifically, the heat storage material is a phase change type heat storage material. In addition, the heat conductive member has a wavy shape and includes a resin reinforced graphite sheet using a stack with a formed graphite layer and the like. The sheet member includes two types of films including a heat conductive material layer and having different rigidities from each other.

CITATION LIST

Patent Literature

Patent Literature 1: JP 2017-75773 A

SUMMARY OF INVENTION

Technical Problem

The heat storage unit described above has been made in order to increase overall strength and the degree of freedom in shape. However, in the heat storage unit, a plurality of members having various characteristics and shapes is arranged and joined, so that the structure of the heat storage unit becomes complicated and the assembly thereof inevitably becomes complicated.

The present invention has been made in view of the above points, and an object thereof is to provide a heat storage unit having a simple configuration, capable of being attached to various objects, and capable of efficiently performing heat exchange.

Solution to Problem

A characteristic of the heat storage unit according to the present invention is that the heat storage unit includes
at least one inorganic fiber member configured by binding or entangling inorganic fibers and having a desired shape; and
a heat storage material in contact with the inorganic fiber.

Advantageous Effects of Invention

The heat storage unit has a simple configuration, capable of being attached to various objects, and capable of efficiently performing heat exchange.

DESCRIPTION OF EMBODIMENTS

Summary of Present Embodiments

First Aspect

Figure 1:
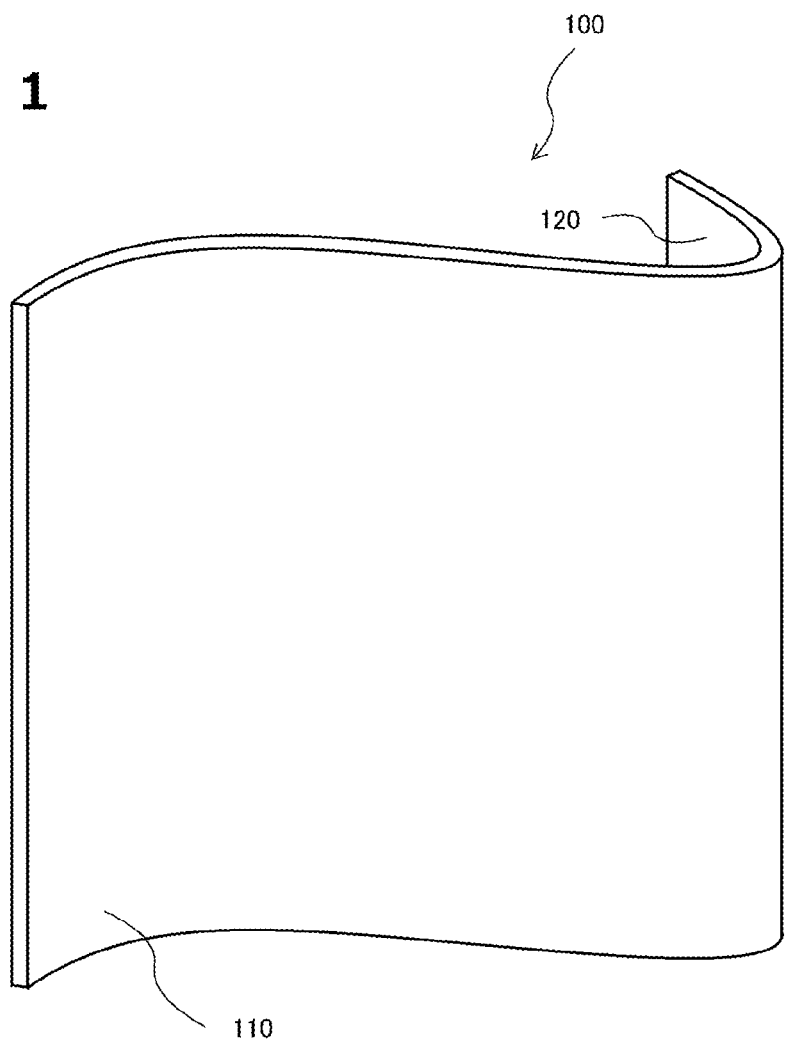
FIG. 1 is a schematic diagram illustrating an appearance of an inorganic fiber sheet 100.

According to a first aspect, provided is a heat storage unit including:
- at least one inorganic fiber member (for example, an inorganic fiber sheet 100 to be described later or the like) configured by binding or entangling inorganic fibers (for example, inorganic fibers 102 to be described later or the like) and having a desired shape; and
- a heat storage material (for example, a heat storage material 200 to be described later or the like) in contact with the inorganic fiber.

The heat storage unit according to the first aspect includes at least one inorganic fiber member and the heat storage material. The inorganic fiber member includes the inorganic fibers, and the inorganic fibers are configured by binding or entangling. The inorganic fiber member has a desired shape. Note that the inorganic fiber may or may not have flexibility. It does not matter whether the flexibility of the inorganic fiber is large or small and present or absent.

With such a configuration, the heat storage unit according to the first aspect includes at least one inorganic fiber member and the heat storage material, and thus can have a simple configuration. In addition, the heat storage unit according to the first aspect is capable of efficiently performing heat exchange between the heat storage material and the outside via the inorganic fiber member.

Second Aspect

A second aspect is configured so that in the first aspect, the second aspect is arranged in contact with a flow path through which a heating medium flows, and an inorganic fiber member configured by binding or entangling inorganic fibers is arranged in the flow path.

Third Aspect

A third aspect is configured so that in the first aspect, a housing (for example, a housing 300 to be described later or the like) that houses the inorganic fiber member and the heat storage material is further provided.

Fourth Aspect

According to a fourth aspect,
provided is a heat storage unit (for example, a heat storage unit 10, a high-temperature heat storage unit 640, a low-temperature heat storage unit 650 to be described later or the like) used in a heat exchange device (for example, a temperature adjustment device 600 to be described later or the like) for regulating a temperature of an object, in which
the heat exchange device further includes:
- a temperature adjustment unit (for example, a workpiece temperature control unit 630 to be described later or the like) that adjusts a temperature of an object installation portion in which an object is installed;
- a heating medium supply unit (for example, a high-temperature chiller 610, a low-temperature chiller 620 to be described later or the like) that supplies a heating medium having a predetermined temperature (for example, a predetermined high temperature, a predetermined low temperature to be described later or the like) to the temperature adjustment unit;
- a first supply flow path (for example, pipes 702, 703, 706, 704, and 705 to be described later or the like) that supplies the heating medium from the heating medium supply unit to the temperature adjustment unit;
- a return flow path (for example, pipes 708, 710, 712, 714, and 716 to be described later or the like) that is provided adjacently to the heat storage unit, returns the heating medium from the temperature adjustment unit to the heating medium supply unit, and allows heat exchange between the heating medium and the heat storage unit;
- a second supply flow path (for example, 702, 720, 704, and 722 to be described later or the like) that supplies the heating medium from the heating medium supply unit to the heat storage unit; and
- a flow path forming unit (for example, branching portions 752 and 754 to be described later or the like) that forms either the first supply flow path or the second supply flow path, the heat storage unit includes:
- at least one inorganic fiber body (for example, inorganic fiber sheet 100 to be described later or the like) configured by binding or entangling inorganic fibers (for example, inorganic fibers 102 to be described later or the like); and
- a heat storage material (for example, a heat storage material 200 to be described later or the like) formed in contact with the inorganic fiber, when the first supply flow path is formed by the flow path forming unit, a temperature of the heating medium is brought close to the predetermined temperature (for example, a state in FIG. 17 to be described later or the like) by heat exchange between the heat storage material and the heating medium, and when the second supply flow path is formed by the flow path forming unit, the heat storage material is regenerated (for example, a state of FIG. 18 or FIG. 19 to be described later or the like) by heat exchange between the heat storage material and the heating medium.

In the heat exchange device, the heat storage material is used as an auxiliary engine for heat exchange, whereby it is easy to bring the temperature of the heating medium close to a desired predetermined temperature. That is, the load of a control device such as a temperature controller can be reduced by using the heat storage unit of the present invention instead of completely relying on the control device such as a temperature controller.

Fifth Aspect

Figure 17:
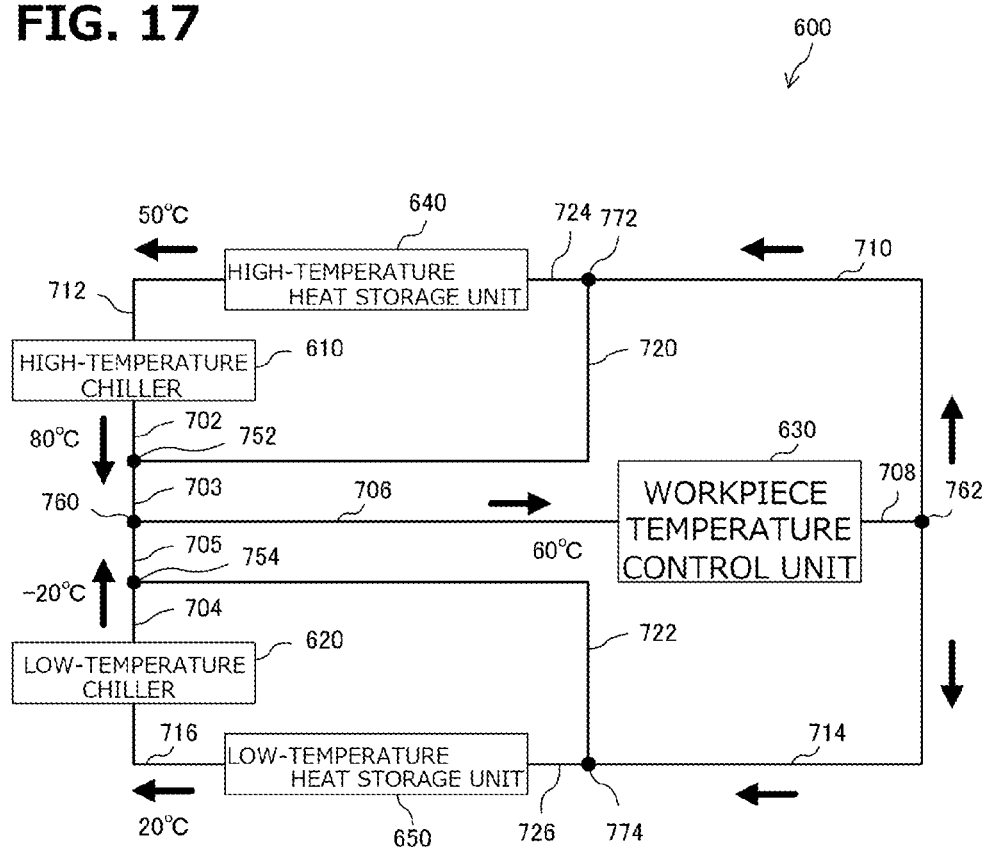
FIG. 17 is a schematic diagram illustrating a configuration of a temperature adjustment device 600 for adjusting a workpiece (object) to a predetermined temperature.
Figure 18:
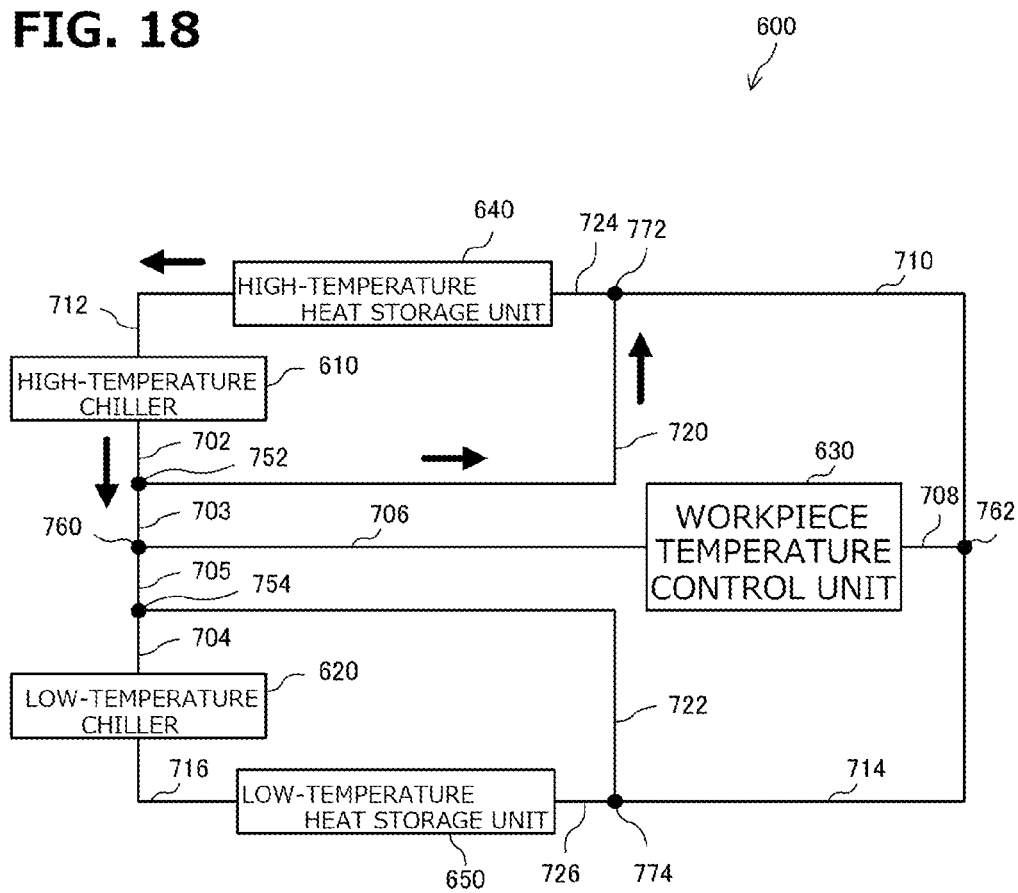
FIG. 18 is a diagram illustrating a flow path for regenerating a high-temperature heat storage unit 640.
Figure 19:
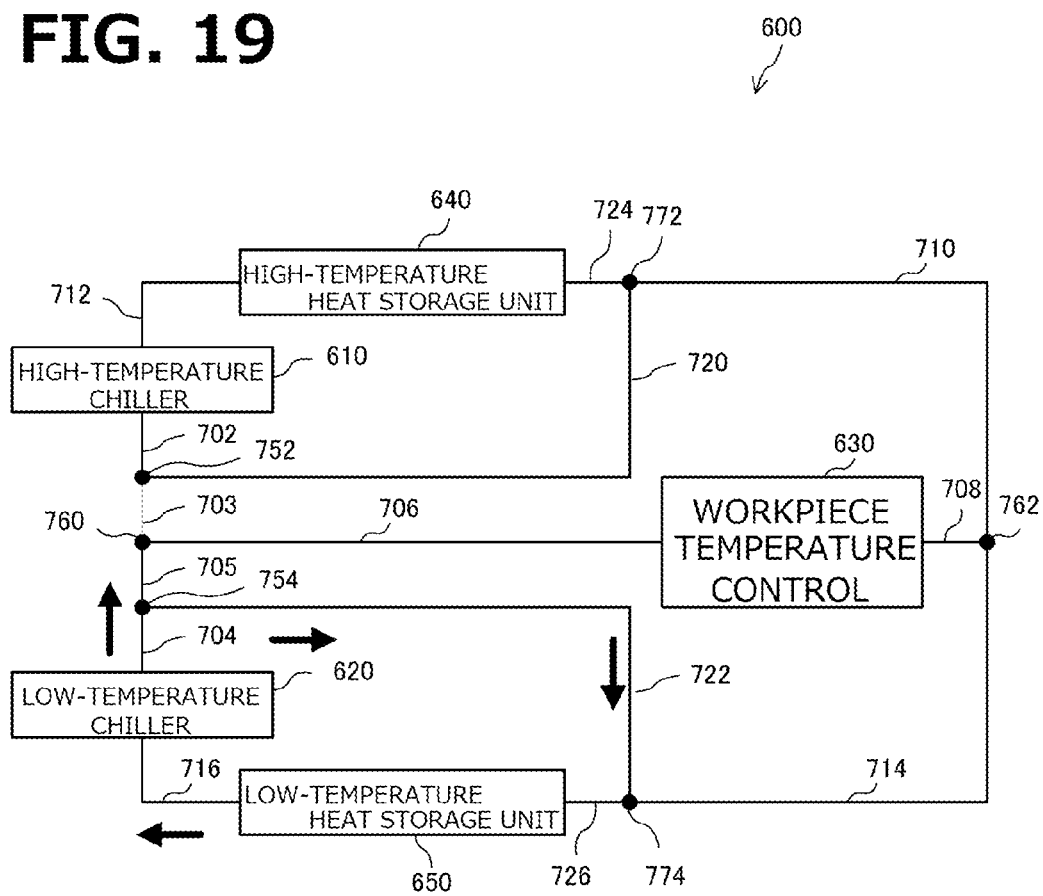
FIG. 19 is a diagram illustrating a flow path for regenerating a low-temperature heat storage unit 650.

A fifth aspect is configured so that in the fourth aspect, in a case where the heating medium is a warming medium,
when the first supply flow path is formed by the flow path forming unit, heat is transferred from the heat storage material to the warming medium, whereby a temperature of the warming medium is increased and brought close to the predetermined temperature (for example, a state in FIG. 17 to be described later or the like), and
when the second supply flow path is formed by the flow path forming unit, heat is transferred from the warming medium to the heat storage material, whereby a temperature of the heat storage material is increased and the heat storage material is regenerated (for example, a state of FIG. 18 or FIG. 19 to be described later or the like).

Sixth Aspect

A sixth aspect is configured so that in the fourth aspect, in a case where the heating medium is a cooling medium,
when the first supply flow path is formed by the flow path forming unit, heat is transferred from the cooling medium to the heat storage material, whereby a temperature of the cooling medium is decreased and brought close to the predetermined temperature (for example, a state in FIG. 17 to be described later or the like), and
when the second supply flow path is formed by the flow path forming unit, heat is transferred from the heat storage material to the cooling medium, whereby a temperature of the heat storage material is decreased and the heat storage material is regenerated (for example, a state of FIG. 18 or FIG. 19 to be described later or the like).

Details of Present Embodiments

Hereinafter, the embodiments will be described with reference to the drawings.

<<<<Configuration of Heat Storage Unit 10>>>

The heat storage unit 10 mainly includes the inorganic fiber sheet 100 and the heat storage material 200. Furthermore, the heat storage unit 10 may have the housing 300. The presence or absence of the housing 300 will be described in detail later.

<<<Inorganic Fiber Sheet 100 and Heat Storage Material 200>>

<<Inorganic Fiber Sheet 100>>

The inorganic fiber sheet 100 is not particularly limited as long as the effect of the present invention is not impaired, and examples thereof include a sheet obtained by wet papermaking of the inorganic fiber 102, an inorganic fiber sheet prepared by a publicly known method of producing a dry nonwoven fabric, and a sheet (for example, mesh) in which inorganic long fibers are woven and the like. Among those sheets, the fiber sheet obtained by wet papermaking is suitable because the thickness of the sheet can be reduced, and furthermore, the inorganic fibers 102 and the like are uniformly dispersed to form a dense network structure, and the fiber sheet is a uniform sheet with little variation in thickness and weight. By making the inorganic fiber sheet 100 thin and uniform, it is possible to include a plurality of inorganic fiber sheets 100 in the heat storage unit 10 according to the present invention, and it becomes possible to make uniform and rapid heat exchange through the heat storage and heat dissipation of the heat storage unit 10 as a whole.

A fiber used for the inorganic fiber sheet 100 according to the present invention is not particularly limited as long as the fiber is an inorganic fiber. Examples of the fiber include a single metal fiber such as copper, silver, gold, platinum, aluminum, nickel, chromium, and tungsten; an alloy fiber such as stainless steel, a copper alloy, a tungsten alloy, and a chromium alloy; a glass fiber; an alumina fiber; a graphite fiber; a carbon fiber; a silica fiber; a boron fiber; and the like. These fibers can be used alone or in combination of a plurality of kinds thereof. Among these fibers, a material having high heat conductivity is preferable, the metal fiber and the alloy fiber are preferable, and copper, silver, aluminum, stainless steel, and the copper alloy are more preferable because it is possible to increase speed of heat storage and heat dissipation of the heat storage unit 10 according to the present invention.

In addition, the inorganic fiber sheet 100 according to the present invention may contain organic fibers as long as the effects of the present invention are not impaired. The upper limit of the content of the organic fiber can be, for example, 20% or less.

Note that in the heat storage unit 10 according to the present invention, an organic fiber sheet can be used instead of the inorganic fiber sheet 100. In particular, in a case where an organic fiber sheet made of a material having higher heat conductivity than the heat storage material 200 to be described later is used, the effect of the heat storage unit 10 of the present invention can be exhibited. Here, examples of the organic fiber sheet made of a material having higher heat conductivity include a crystalline polymer fiber such as an aramid fiber, a polyethylene fiber, a polyamide fiber, a polytetrafluoroethylene fiber, and a polyethylene terephthalate fiber. However, the fiber sheet used in the present invention is preferably a material having high heat conductivity, and in a case where an organic fiber sheet having low heat conductivity is used instead of an inorganic fiber sheet 100, the heat storage unit 10 is inferior in performance.

Other additives can be added to the inorganic fiber sheet 100 as necessary. Examples of the additive include a binder and a thickener. Examples of the binder include an acrylic resin and polyvinyl alcohol and the like.

As the inorganic fiber sheet 100, a sheet obtained by binding the inorganic fibers 102 with a binder resin at the time of manufacturing can be used, but this sheet is made a sheet of 100% inorganic fibers sintered at a temperature at which the inorganic fibers 102 are not completely melted in a vacuum or non-oxidizing atmosphere gas, whereby a sheet that contains no organic substance and has strength with the inorganic fibers 102 fused to each other can be prepared. In a case where there are many bonds between the inorganic fibers 102, heat transfer in the inorganic fibers 102 is rapidly performed, and the heat storage and heat dissipation of the heat storage unit 10 according to the present invention can be efficiently performed.

The fiber diameter of the fiber used for the inorganic fiber sheet 100 is not particularly limited, but can be, for example, 1 μm to 50 μm, preferably 2 μm to 30 μm, and more preferably 3 μm to 20 μm.

The fiber length of the fiber used for the inorganic fiber sheet 100 is not particularly limited as long as the fiber length does not interfere with the manufacturing, and can be, for example, 0.1 mm to 5 mm, preferably 0.5 mm to 3 mm, more preferably 1 mm to 2 mm.

The porosity of the inorganic fiber sheet 100 is not particularly limited, but can be, for example, 30% to 99%, more preferably 40% to 98%, and still more preferably 50% to 97%. In a case where the inorganic fiber sheet 100 is within such ranges, the inorganic fiber sheet 100 having rigidity can be formed. In addition, the heat storage material 200 can spread throughout the inside of the inorganic fiber sheet 100, and the heat storage material 200 can be in close contact with a fiber surface constituting the inorganic fiber sheet 100 in a wide area. Therefore, the heat storage unit 10 can efficiently store and dissipate heat in and from the heat storage material 200 via the inorganic fiber sheet 100.

The porosity is a proportion of a space with no fiber present to the volume of a fiber sheet, and is calculated from the volume and mass of the fiber sheet and the density of a fiber material.

The porosity (%)=(1−the mass of a fiber sheet/(the volume of the fiber sheet×the density of a fiber))×100

Note that the porosity can be adjusted by the thickness and amount of the fiber to be used, the density of a material in which the fibers are entangled, and pressure in compression molding.

Note that in an example described above, the inorganic fiber sheet 100 includes only the inorganic fiber 102, but may include a fiber other than the inorganic fiber 102, and the like.

<<Heat Storage Material 200>>

The heat storage material 200 according to the present invention transfers heat from the heating medium via the inorganic fiber sheet 100, and stores and dissipates heat. As the heat storage material 200, a heat storage material of a sensible heat storage type, a latent heat storage type, or a chemical heat storage type can be used, and the heat storage material 200 is not particularly limited.

Since the sensible heat storage type heat storage material 200 has a relatively low heat storage density, the sensible heat storage type heat storage material 200 has low heat storage efficiency, but is very excellent in terms of stability, safety, price, ease of handling, and durability. The latent heat storage type heat storage material 200 has a high heat storage density and is excellent in heat storage efficiency as well as is very excellent in stability, safety, price, ease of handling, and durability. The chemical heat storage type heat storage material 200 has a very high heat storage density and is very excellent in heat storage efficiency, but has low stability, safety, price, ease of handling, and durability. Therefore, in the heat storage unit 10 according to the present invention, the latent heat storage type heat storage material 200 can be preferably used. In addition, a heat storage temperature and heat storage energy can be controlled by adjusting the components of the heat storage material 200 and a mixing ratio.

As the latent heat storage type heat storage material 200, which is a preferable example, a heat storage material of a type in which heat applied to the heat storage material 200 is stored as latent heat when a solid-liquid phase transition occurs or a heat storage material of a type in which heat is stored as latent heat when a solid-solid phase transition occurs can be used.

Examples of the heat storage material 200 using the latent heat of a solid-liquid phase transition include a single-component heat storage material such as water (ice), paraffin series, an alkali metal hydroxide, magnesium hydroxide, beryllium hydroxide, an alkaline earth metal hydroxide, an inorganic salt such as nitrate, and an inorganic hydrated salt such as sodium acetate trihydrate; and a mixture of a plurality of components such as a mixture of inorganic salts or inorganic hydrates such as a mixture of magnesium nitrate hexahydrate and magnesium chloride hexahydrate, a mixture of organic compounds such as a mixture of lauric acid and capric acid, and a mixture of an inorganic salt and an organic compound such as a mixture of ammonium nitrate and urea. In addition, as the paraffin series, for example, a heat storage material including n-pentadecane that is an n-paraffin series heat storage material and a heat storage material including an elastomer and paraffin can be used.

The heat storage material 200 using the latent heat of a solid-liquid phase transition can be used in the heat storage unit 10 of the present invention, for example, by applying heat to the heat storage material 200 using the latent heat of a solid-liquid phase transition to form a liquid phase, then impregnating the inorganic fiber sheet 100 according to the present invention in the heat storage material 200 or immersing the inorganic fiber sheet 100 in heat storage material 200 formed into the liquid phase, then decreasing the temperature to form a solid phase, and embedding the inorganic fiber sheet 100 in the heat storage material 200 or the like.

Examples of the heat storage material 200 using the latent heat of a solid-solid phase transition include an organic compound such as a polyethylene glycol copolymer cross-linked conjugate; a transition metal ceramic such as $LiMnO_4$, $LiVS_2$, $LiVO_2$, $NaNiO_2$, $LiRh_2O_4$, $V_2O_3$, $V_4O_7$, $V_6O_{11}$, $Ti_4O_7$, $SmBaFe_2O_5$, $EuBaFe_2O_5$, $GdBaFe_2O_5$, $TbBaFe_2O_5$, $DyBaFe_2O_5$, $HoBaFe_2O_5$, $YBaFe_2O_5$, $PrBaCo_2O_{5.5}$, $DyBaCo_2O_{5.54}$, $HoBaCo_2O_{5.48}$, and $YBaCo_2O_{5.49}$; vanadium dioxide ($VO_2$) in which part of vanadium is substituted with metal such as niobium (Nb), molybdenum (Mo), ruthenium (Ru), tantalum (Ta), tungsten (W), rhenium (Re), osmium (Os), and iridium (Ir). The vanadium dioxide in which part of vanadium is substituted with the metal is a compound that can be represented as $V_{1-x}M_xO_2$ when the substituted metal is M and the amount of substituted M is x. Here, x is a decimal number greater than 0 and less than 1.

The heat storage material 200 using the latent heat of a solid-solid phase transition can be used in the heat storage unit 10 of the present invention, for example, by forming the heat storage material 200 using the latent heat of a solid-solid phase transition into powders and filling and supporting the powders in the inorganic fiber sheet 100 according to the present invention or the like, or embedding the inorganic fiber sheet 100 in the heat storage material 200 formed into powders or the like.

In addition, the heat storage material 200 using the latent heat of a solid-solid phase transition can be used as a lump material of a shape such as a sheet-like shape and a block-like shape by being layered or brought into contact with the inorganic fiber sheet 100.

<<Configuration of Inorganic Fiber Sheet 100>>

FIG. 1 is a schematic diagram illustrating an appearance of the inorganic fiber sheet 100. As illustrated in FIG. 1, the inorganic fiber sheet 100 has a flexible sheet-like (thin plate-like) form. The inorganic fiber sheet 100 can be deflected or bent, and can be deformed into a desired shape. In addition, the inorganic fiber sheet 100 can be processed by cutting or the like, and the inorganic fiber sheet 100 can be processed into a desired size. As will be described later, the inorganic fiber sheet 100 can be arranged in a shape and a size corresponding to the shape, size, and the like of a member such as a pipe. Note that the inorganic fiber sheet 100 may be not only one having flexibility but also one having high rigidity and no flexibility. An appropriate inorganic fiber sheet 100 is appropriately selected in terms of to the magnitude and presence or absence of flexibility according to the state, shape, and size of the inorganic fiber sheet 100 housed in the heat storage unit 10, the type of the heat storage material 200, and the like.

The inorganic fiber sheet 100 has a sheet-like shape, has a predetermined thickness, and has two constant surfaces facing each other in opposite directions that are a first surface 110 and a second surface 120 opposite to the first surface. Note that the thickness of the inorganic fiber sheet 100 does not necessarily need to be constant, and any thickness can be used as long as the first surface 110 and the second surface 120 are defined from each other.

Figure 2:
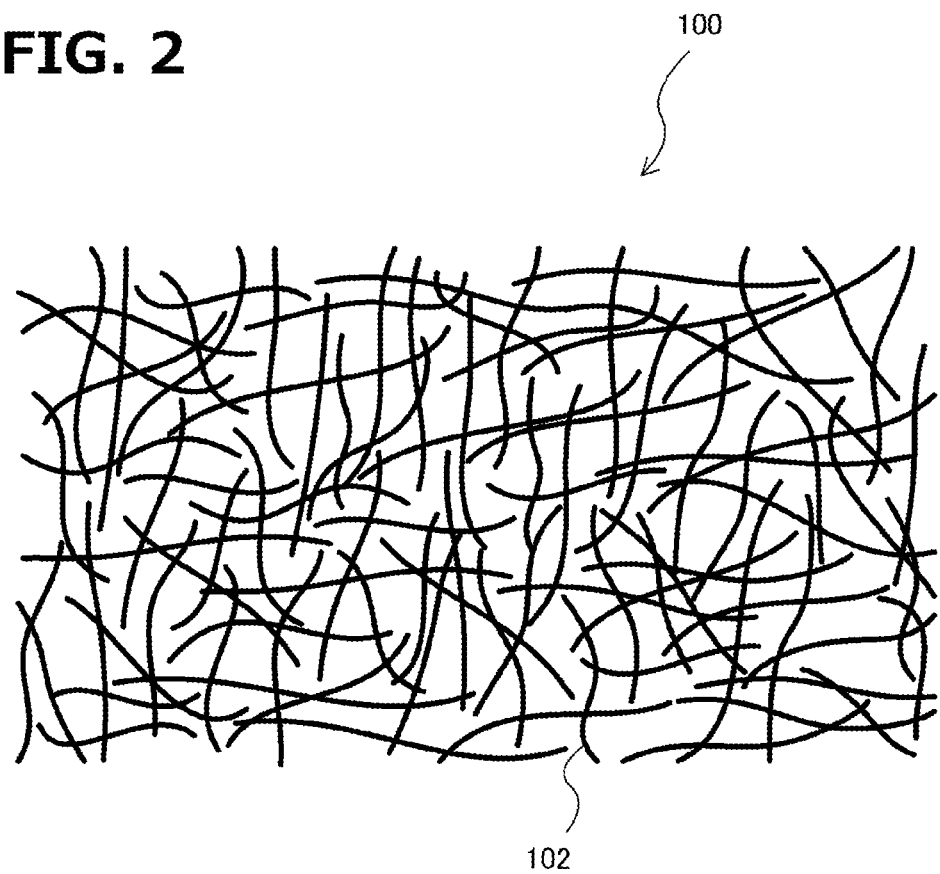
FIG. 2 is a schematic diagram illustrating a microscopic state of an inorganic fiber 102 constituting the inorganic fiber sheet 100 by enlarging the inorganic fiber sheet 100.

FIG. 2 is a schematic diagram illustrating a microscopic state of the inorganic fiber 102 constituting the inorganic fiber sheet 100 by enlarging the inorganic fiber sheet 100. The inorganic fiber sheet 100 is formed by binding or entangling a part of adjacent inorganic fibers 102. Each of the inorganic fibers 102 may be bound or entangled at only one location, or may be bound or entangled at a plurality of locations. By binding or entangling adjacent inorganic fibers 102, heat can be transferred one after another throughout a plurality of inorganic fibers 102 that is bound or entangled.

As described above, the inorganic fiber sheet 100 only needs to be configured to be heat conductive while being capable of maintaining a state in which the inorganic fibers 102 are bound or entangled, and the inorganic fiber sheet 100 is not limited in terms of forms such as a shape and a size, and only needs to be an inorganic fiber body constituted by the inorganic fiber 102. For example, as will be described later, the inorganic fiber sheet 100 is used for heat exchange (heat transfer) with the outside of the heat storage unit 10. Note that the outside of the heat storage unit 10 includes a heating medium (heating medium) such as a warming medium and a cooling medium that flow through a member such as a pipe to which the heat storage unit 10 is attached and the like.

<<<Type of Contact Between Inorganic Fiber Sheet 100 and Heat Storage Material 200>>>

Figure 3:
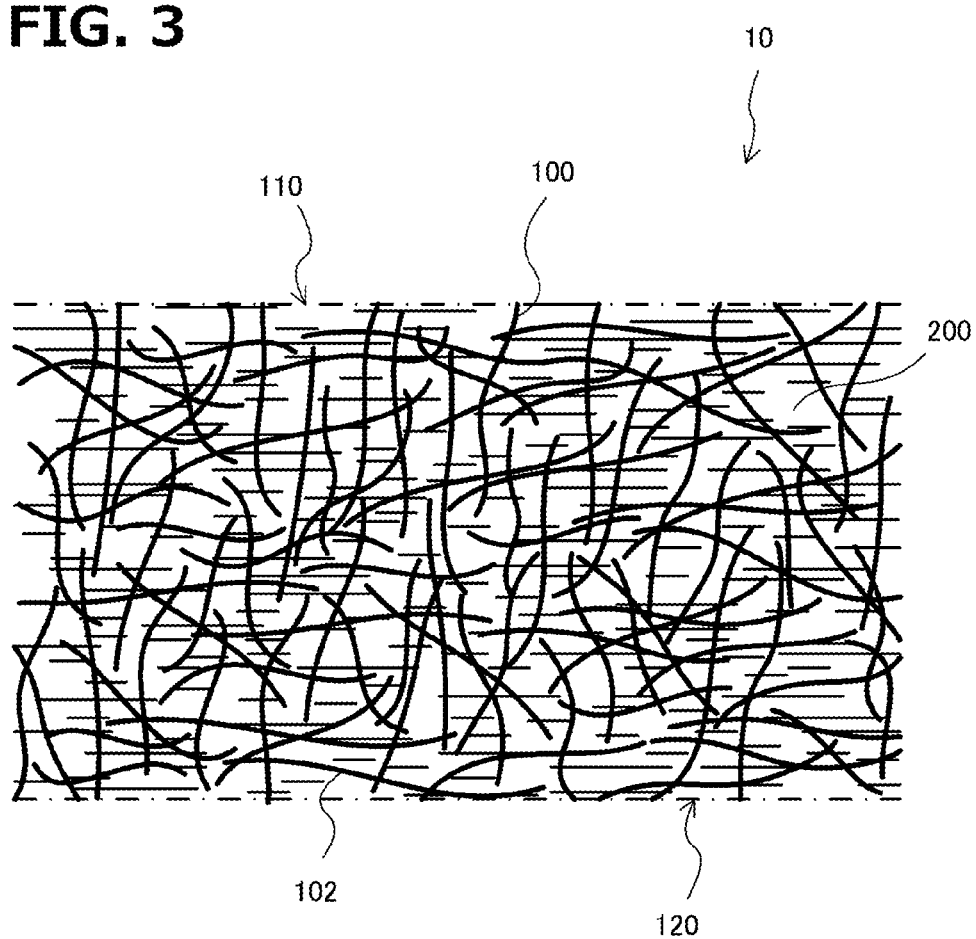
FIG. 3 is a conceptual diagram illustrating a microscopic state in which the inorganic fiber sheet 100 is in contact with the heat storage material 200 by enlarging the inorganic fiber sheet 100 and the heat storage material 200 constituting the heat storage unit 10.

FIG. 3 is a conceptual diagram illustrating a microscopic state in which the inorganic fiber sheet 100 is in contact with the heat storage material 200 by enlarging the inorganic fiber sheet 100 and the heat storage material 200 constituting the heat storage unit 10. In FIG. 3, a black curve indicates the inorganic fiber 102 constituting the inorganic fiber sheet 100, and a plurality of horizontal lines indicates regions where the heat storage material 200 exists. Note that it is assumed that the heat storage material 200 is continuously formed in the regions illustrated by the plurality of horizontal lines.

As illustrated in FIG. 3, the heat storage unit 10 has the inorganic fiber sheet 100 and the heat storage material 200. As described above, the inorganic fibers 102 constituting the inorganic fiber sheet 100 are bound or entangled with each other. A gap (void) is formed between the adjacent inorganic fibers 102. In an example illustrated in FIG. 3, the heat storage material 200 is filled in the gap between the adjacent inorganic fibers 102 to be continuously formed. As described above, the heat storage material 200 is in contact not only with the inorganic fiber 102 in a surface (first surface 110 or second surface 120) portion of the inorganic fiber sheet 100 but also in contact with the inorganic fiber 102 present in the region inside the inorganic fiber sheet 100. Note that in FIG. 3, the first surface 110 or the second surface 120, which is the surface of the inorganic fiber sheet 100, is illustrated by an alternate long and short dash line in order to clearly illustrate the first surface 110 or the second surface 120. As described above, in an example illustrated in FIG. 3, the inorganic fibers 102 constituting the inorganic fiber sheet 100 are in contact with the heat storage material 200 as a whole. That is, in the example illustrated in FIG. 3, the heat storage material 200 is filled over the entire region (surfaces and an internal region) of the inorganic fiber sheet 100.

Note that the entire gap between the inorganic fibers 102 may not be sufficiently filled with the heat storage material 200, and a certain degree of gap (air layer or region) may be generated (not illustrated). When the heat storage material 200 is in contact with at least the surface of a part of the inorganic fibers 102, heat can be stored in the heat storage material 200, and heat exchange can be performed between the outside of the heat storage unit 10 and the heat storage material 200.

By bringing the inorganic fiber 102 into contact with the heat storage material 200, heat exchange can be directly performed between the inorganic fiber 102 and the heat storage material 200 without passing through air. Specifically, heat introduced from the outside of the heat storage unit 10 is first transferred to the inorganic fiber 102 of the inorganic fiber sheet 100, then transferred to the heat storage material 200 via the inorganic fiber sheet 100, and stored in the heat storage material 200. Meanwhile, the heat stored in the heat storage material 200 is first transferred to the inorganic fiber 102 of the inorganic fiber sheet 100, and then led out to the outside of the heat storage unit 10 via the inorganic fiber sheet 100.

The type of contact between the inorganic fiber sheet 100 and the heat storage material 200 includes an embedded type, an impregnated type, a supported type, a layered type, and the like as will be illustrated below. Also in FIGS. 4 to 8 illustrated below, a black curve indicates the inorganic fiber 102 constituting the inorganic fiber sheet 100, and a plurality of horizontal lines indicates regions where the heat storage material 200 exists. In the regions illustrated by the plurality of horizontal lines, the heat storage material 200 is continuously formed. The supported type is an aspect in which, for example, a particulate heat storage material is fixed to an inorganic fiber surface constituting the inorganic fiber sheet 100.

<<Impregnated Type>>

Figure 4:
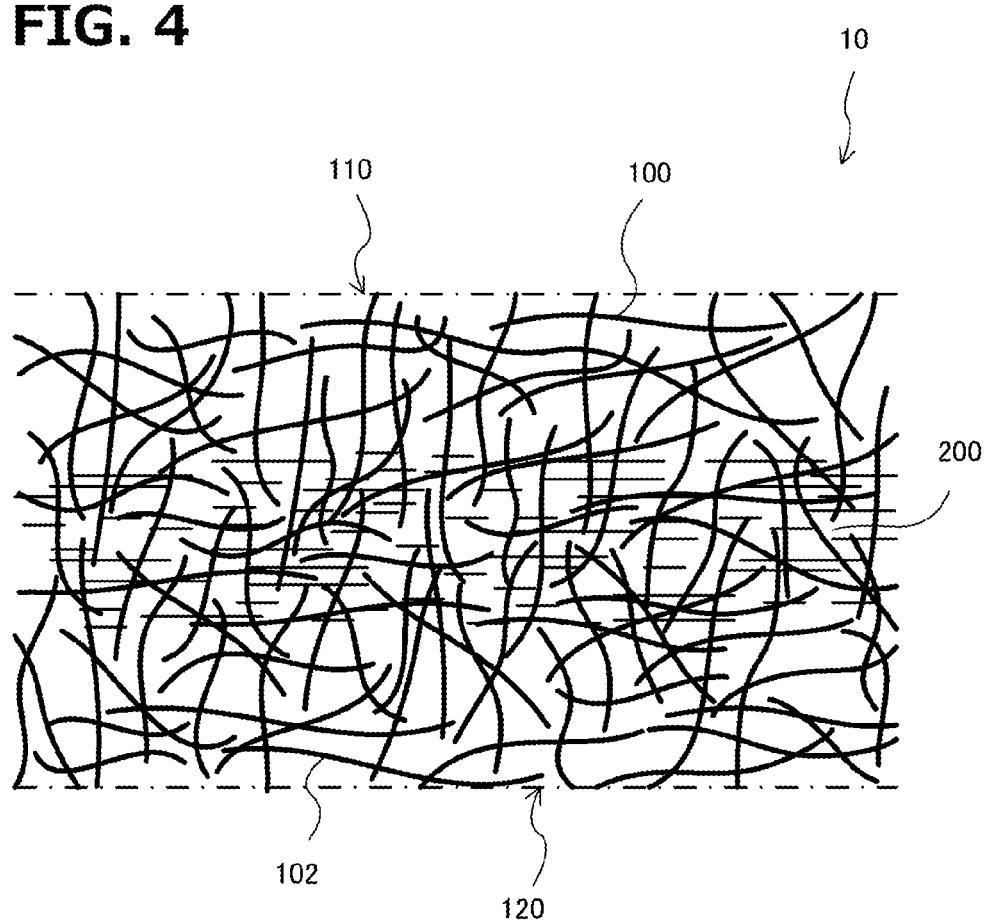
FIG. 4 is a conceptual diagram illustrating a microscopic state of embedded type contact between the inorganic fiber sheet 100 and the heat storage material 200.

FIG. 4 is a conceptual diagram illustrating a microscopic state of impregnated type contact between the inorganic fiber sheet 100 and the heat storage material 200. As in FIG. 3, the heat storage unit 10 has the inorganic fiber sheet 100 and the heat storage material 200. Note that also in FIG. 4, the first surface 110 or the second surface 120 is virtually illustrated by an alternate long and short dash line in order to clearly illustrate the first surface 110 or the second surface 120.

In the impregnated type, the entire heat storage material 200 is embedded in the inorganic fiber sheet 100, whereby the inorganic fiber sheet 100 comes into contact with the heat storage material 200. As in to FIG. 3, a gap between the adjacent inorganic fibers 102 is filled with the heat storage material 200 to be continuously formed. By transferring heat to the inorganic fiber sheet 100 located outside the heat storage material 200, heat can be introduced and stored in the heat storage material 200 existing in a region inside the inorganic fiber sheet 100. Depending on the amount of the heat storage material to be impregnated, an aspect illustrated in FIG. 3 can also be said to be a form of embedding.

<<Embedded Type>>

Figure 5:
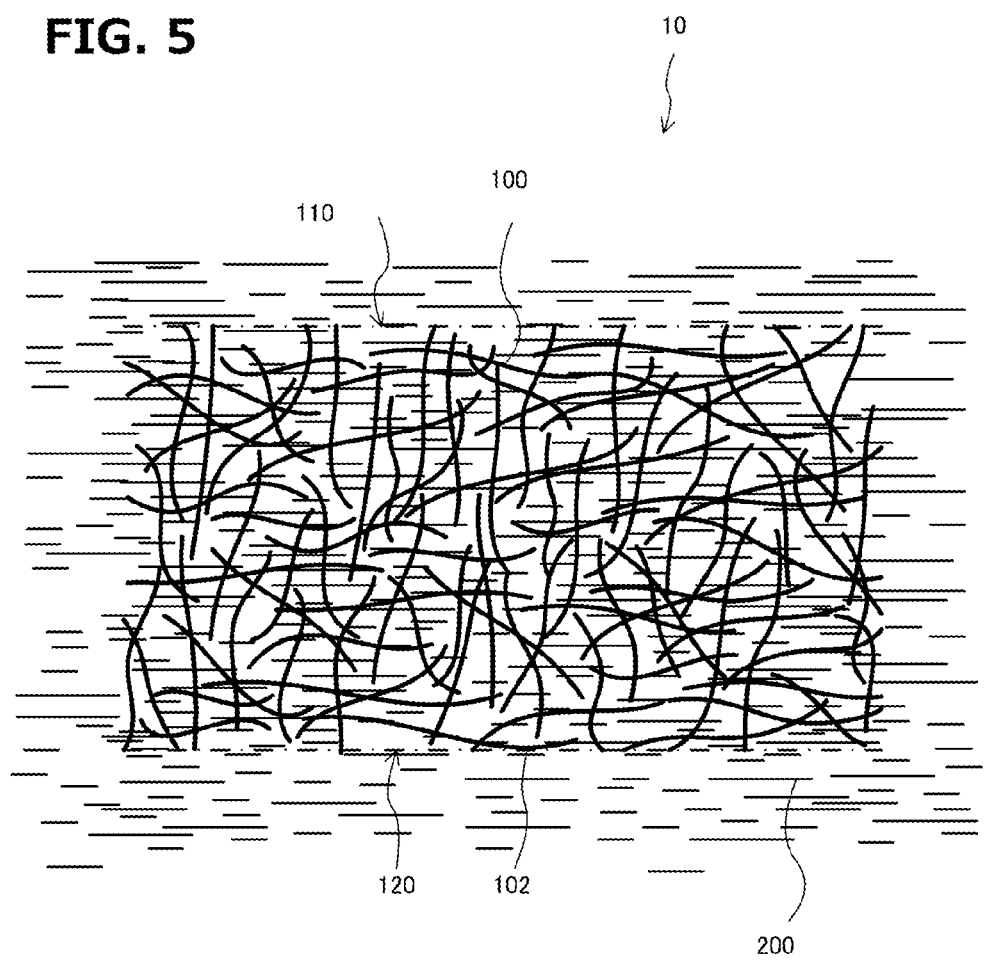
FIG. 5 is a conceptual diagram illustrating a microscopic state of impregnated type contact between the inorganic fiber sheet 100 and the heat storage material 200.

FIG. 5 is a conceptual diagram illustrating a microscopic state of embedded type contact between the inorganic fiber sheet 100 and the heat storage material 200. As in FIGS. 3 and 4, the heat storage unit 10 has the inorganic fiber sheet 100 and the heat storage material 200. Note that also in FIG. 5, the first surface 110 or the second surface 120 is virtually illustrated by an alternate long and short dash line in order to clearly illustrate the first surface 110 or the second surface 120.

In the embedded type, the inorganic fiber sheet 100 (at least part of the inorganic fiber sheet 100) is embedded in the heat storage material 200, whereby a state in which the inorganic fiber sheet 100 is in contact with the heat storage material 200 is maintained. Note that in the case of the embedded type, it is preferable that part of the inorganic fiber sheet 100 is configured to extend to the outside of the heat storage material 200, or the inorganic fiber sheet 100 located inside the heat storage material 200 is connected to a metal body or another inorganic fiber sheet located outside the heat storage material 200. With such a configuration, heat exchange can be performed between the inside and the outside of the heat storage material 200.

<<Layered Type>>

Figure 6:
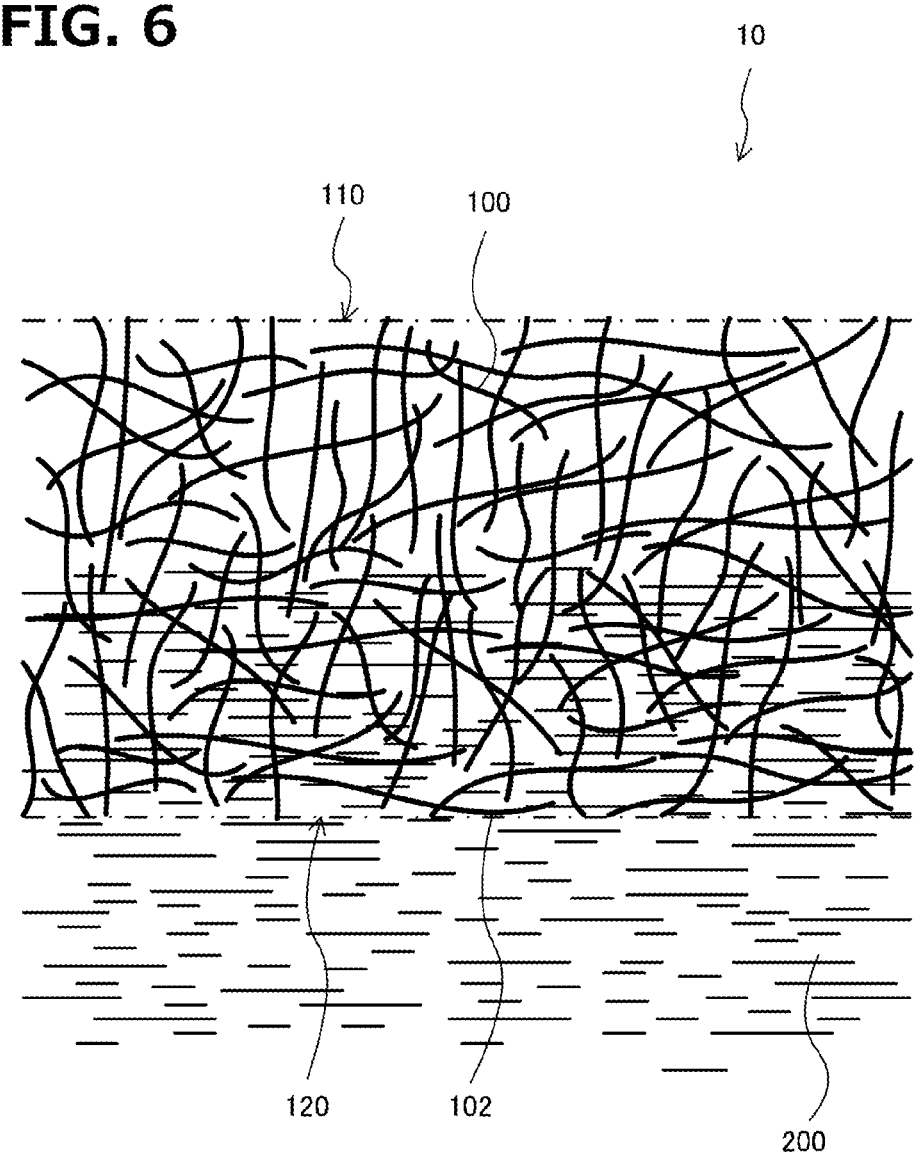
FIG. 6 is a conceptual diagram illustrating a microscopic state of supported type contact between the inorganic fiber sheet 100 and the heat storage material 200.
Figure 7:
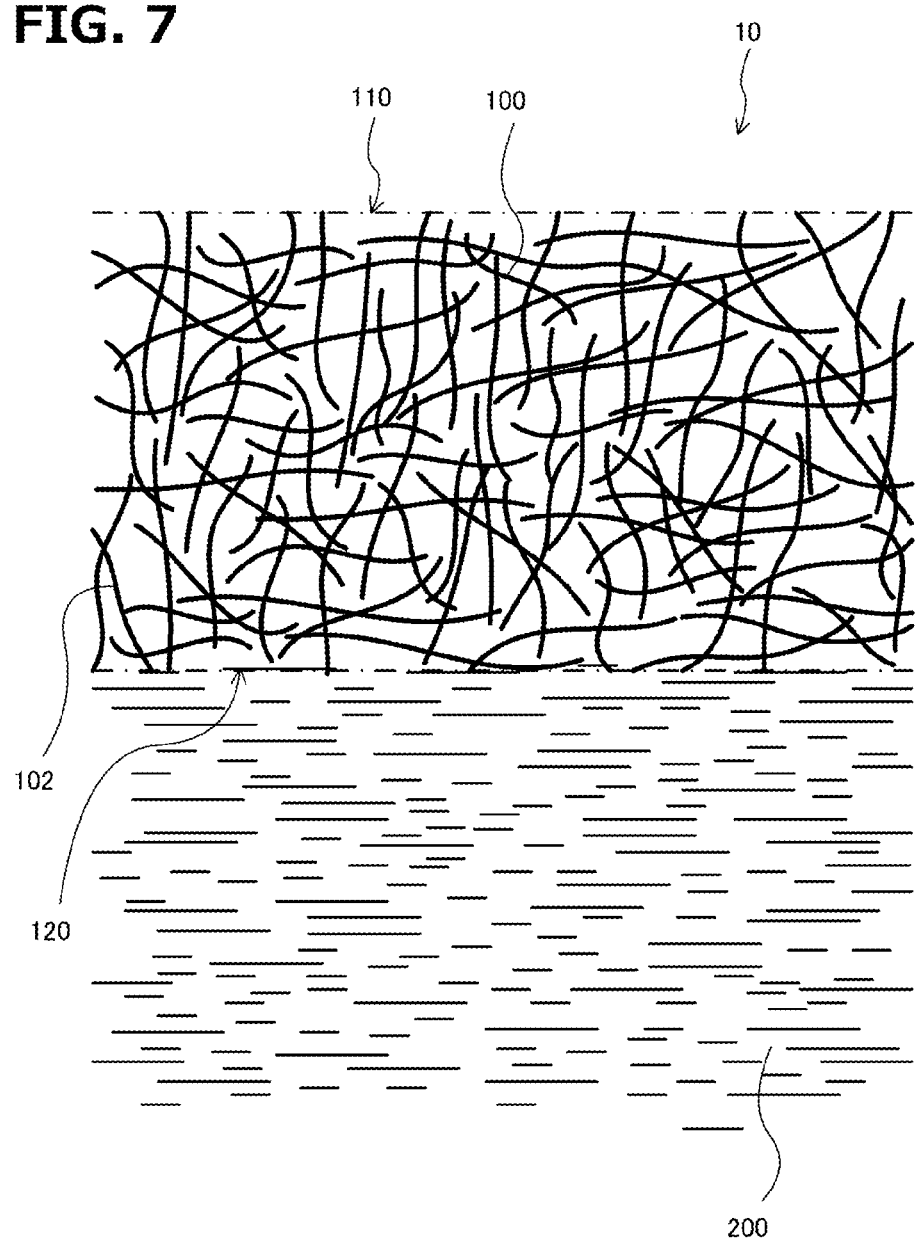
FIG. 7 is a conceptual diagram illustrating a microscopic state of supported type contact between the inorganic fiber sheet 100 and the heat storage material 200.
Figure 8:
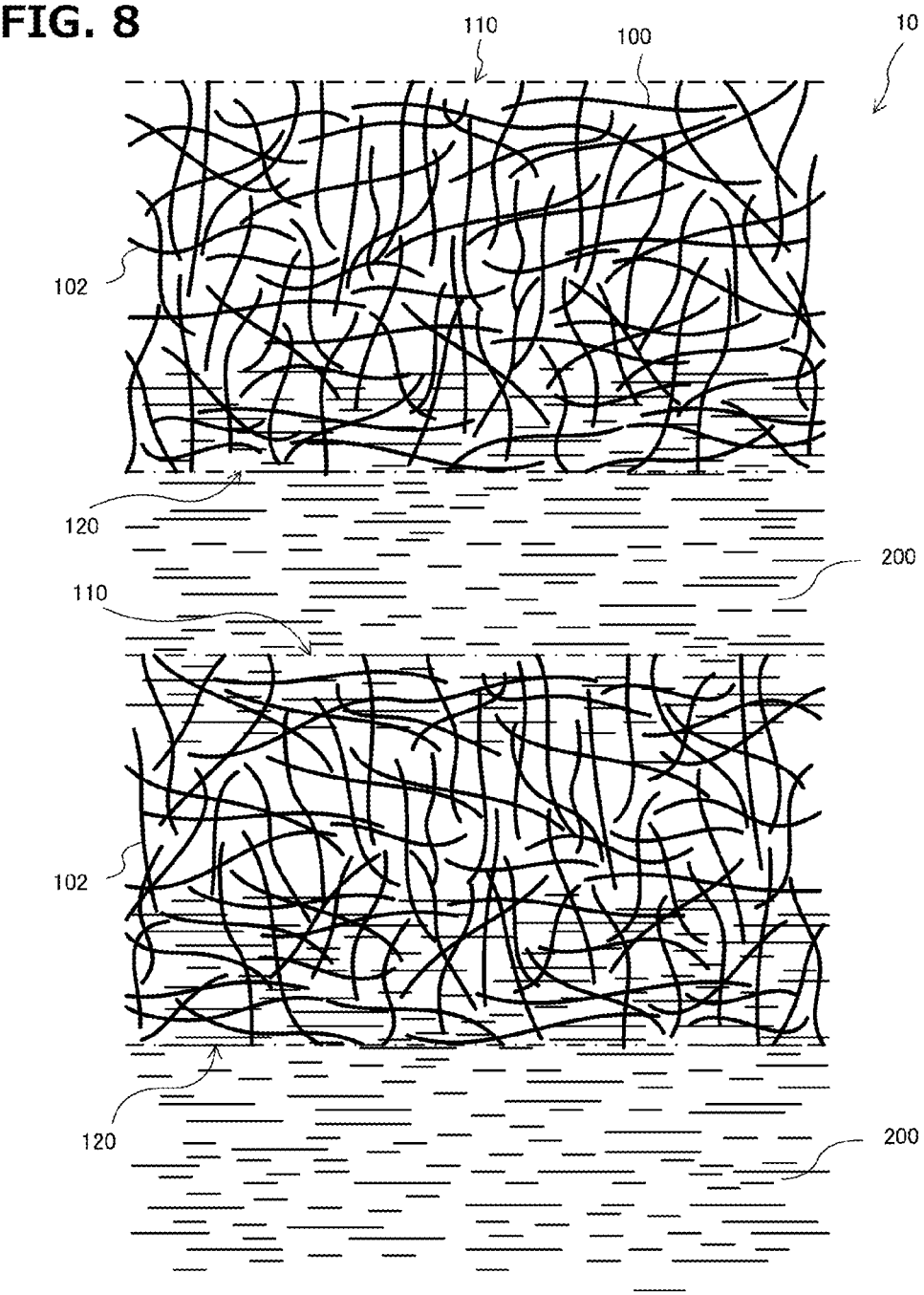
FIG. 8 is a conceptual diagram illustrating a microscopic state of layered type contact between the inorganic fiber sheet 100 and the heat storage material 200.

FIGS. 6, 7, and 8 are conceptual diagrams illustrating a microscopic state of layered type contact between the inorganic fiber sheet 100 and the heat storage material 200. As in FIGS. 3 to 5, the heat storage unit 10 has the inorganic fiber sheet 100 and the heat storage material 200. Note that also in FIGS. 6, 7, and 8, the first surface 110 or the second surface 120 is virtually illustrated by an alternate long and short dash line in order to clearly illustrate the first surface 110 or the second surface 120.

The layered type is an aspect in which only part of the inorganic fiber sheet 100 is in contact with the heat storage material 200, or the heat storage material 200 partially enters the inside of the inorganic fiber sheet 100. FIG. 6 illustrates contact with the heat storage material 200 up to the inside of the inorganic fiber sheet 100, and FIG. 7 illustrates contact with the heat storage material 200 only on the surface of the inorganic fiber sheet 100. FIG. 8 illustrates an aspect in which FIG. 6 is layered.

<<Contact with Heat Storage Material 200>>

In examples illustrated in FIGS. 3 to 8, a case where the inorganic fiber sheet 100 is made in a flat shape has been described as an example, but as described above, the inorganic fiber sheet 100 has flexibility and can be deformed into a desired shape. Even in a case where the inorganic fiber sheet 100 is deformed, various heat storage units 10 can be configured by appropriately selecting the embedded type, the impregnated type, the supported type, the layered type, or the like described above and bringing the heat storage material 200 into contact with the inorganic fiber sheet 100.

Note that also in examples illustrated in FIGS. 4 to 8 and the like, the entire gap between the inorganic fibers 102 of the inorganic fiber sheet 100 may not be sufficiently filled with the heat storage material 200, and a certain degree of gap (air layer or region) may be generated (not illustrated). When the heat storage material 200 is in contact with at least the surface of part of the inorganic fibers 102, heat can be stored in the heat storage material 200, and heat exchange can be performed between the outside of the heat storage unit 10 and the heat storage material 200.

<<Other Types of Contact>>

The embedded type, the impregnated type, the supported type, and the layered type described above are each an example of an aspect in which the inorganic fiber sheet is in contact with the heat storage material 200, and the inorganic fiber sheet 100 only needs to be in contact with the heat storage material 200 so that heat exchange can be performed, and the aspect in which the inorganic fiber sheet is in contact with the heat storage material 200 can be appropriately determined according to the shape and size of the member such as a pipe to which the heat storage unit 10 is attached, the type and flow velocity of the heating medium, and the like.

<<<Specific Layered Structure of Layered Type>>>

Figure 9A:
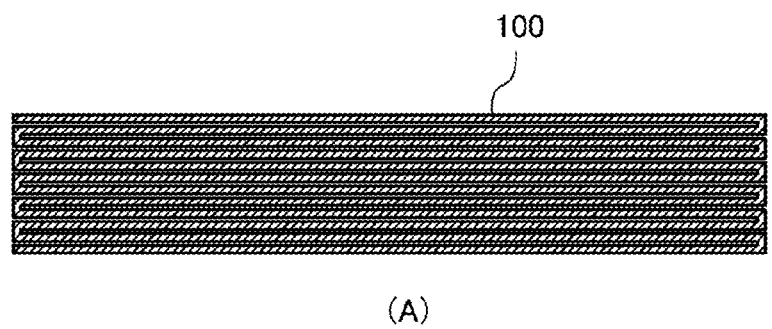
FIG. 9(A) is a conceptual diagram illustrating an example in which by bending a single continuous inorganic fiber sheet 100, the inorganic fiber sheet 100 is formed in an overlapping state.
Figure 9B:
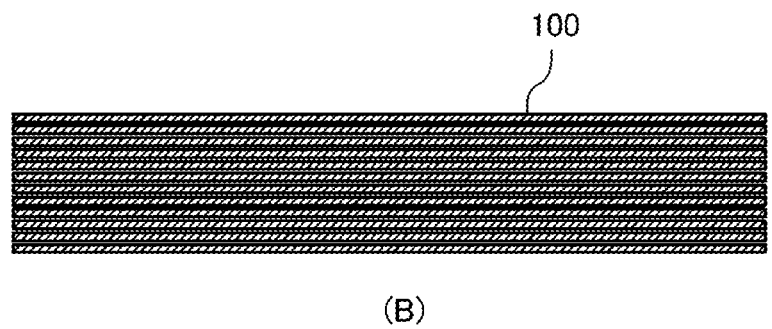
FIG. 9(B) is a conceptual diagram illustrating a state in which a plurality of inorganic fiber sheets 100 that are separate from each other is formed by being overlapped with each other.

As described above, FIG. 8 illustrates a microscopic state of layered type contact between the inorganic fiber sheet 100 and the heat storage material 200. In FIG. 8, the overlapping (adjacent) inorganic fiber sheets 100 are illustrated so as to be separated in order to clearly illustrate a relationship of arrangement of the inorganic fiber sheet 100 and the heat storage material 200. In the case of actually constituting the heat storage unit 10, as illustrated in FIGS. 9A and 9B, the overlapping (adjacent) inorganic fiber sheets 100 are preferably arranged so as to be in contact with each other. Heat can be easily transferred through the entire overlapping inorganic fiber sheet or sheets 100, and heat exchange can be quickly performed between the outside of the heat storage unit 10 and the heat storage material 200.

Note that as described above, in examples illustrated in FIGS. 9A and 9B, the overlapping inorganic fiber sheets 100 are in contact with or bound to each other, but for the sake of clarity, the overlapping inorganic fiber sheets 100 are illustrated to be separated from each other in FIG. 8.

FIG. 9A illustrates an example in which a single continuous inorganic fiber sheet 100 is bent, whereby the inorganic fiber sheet 100 is overlapped to be formed in a substantially rectangular parallelepiped shape. FIG. 9B is an example illustrating a state in which a plurality of flat inorganic fiber sheets 100 that are separate from each other is overlapped with each other to be formed in a substantially rectangular parallelepiped shape. In the example illustrated in FIG. 9A and the example illustrated in FIG. 9B, the overlapping inorganic fiber sheets 100 are in contact with or bound to each other, and heat can be easily transferred through the entire overlapping inorganic fiber sheet or sheets 100.

<<<Specific Structure of Heat Storage Unit 10>>>

Figure 10:
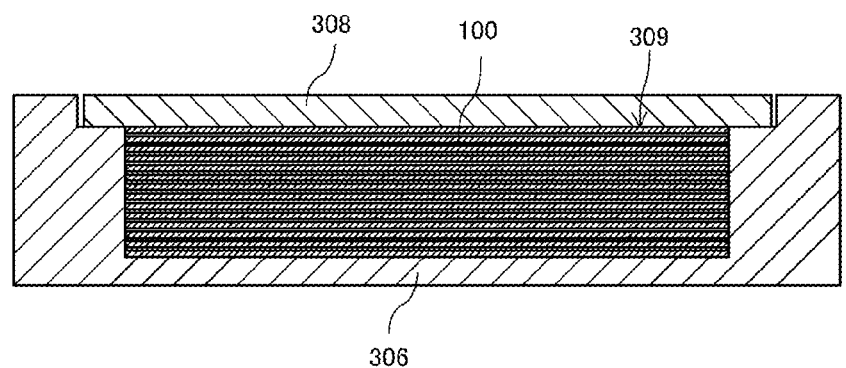
FIG. 10 is a cross-sectional view illustrating a specific structure of a heat storage unit 10 using the inorganic fiber sheets 100 illustrated in FIG. 9B.

FIG. 10 is a cross-sectional view illustrating a specific structure of the heat storage unit 10 using the inorganic fiber sheets 100 illustrated in FIG. 9B. Note that the heat storage unit 10 can be configured also using the inorganic fiber sheet 100 illustrated in FIG. 9A.

The heat storage unit 10 illustrated in FIG. 10 has the housing 300. The housing 300 has a housing portion 306 and a lid body portion 308. The housing portion 306 has a recessed shape and can accommodate the overlapped inorganic fiber sheets 100 and the heat storage material 200 (not illustrated) in the housing portion 306. The lid body portion 308 has a plate-like shape and can be engaged with the upper end portion of the housing portion 306. Materials of the housing portion 306 and the lid body portion 308 can be copper, stainless steel, or the like.

First, the inorganic fiber sheets 100 are housed in the housing portion 306. Specifically, the inorganic fiber sheets 100 are overlapped and housed in the housing portion 306 to such an extent that the entire housing portion 306 is filled. In this way, the housing portion 306 can be roughly filled with the inorganic fiber sheets 100. Next, the lid body portion 308 is engaged with the upper end portion of the housing portion 306, and an opening 309 of the housing portion 306 is covered with the lid body portion 308. The overlapped inorganic fiber sheets 100 are connected or the inorganic fiber sheet 100 and the housing portion 306 or the like are connected by applying heat to the housing portion 306 and sintering. By the connecting, heat can be easily transferred through the entire overlapped inorganic fiber sheets 100. Furthermore, the lid body portion 308 is brazed and sealed to the housing portion 306 with Ni or the like. Note that in a case where the lid body portion 308 can be connected and sealed to the housing portion 306 by sintering, brazing is unnecessary. A sintering temperature, the presence or absence of brazing, a brazing material, and the like are appropriately determined according to the materials of the lid body portion 308 and the housing portion 306.

After the lid body portion 308 is sealed to the housing portion 306, the heat storage material 200 (not illustrated) is injected into the housing portion 306 from an injection hole (not illustrated) of the heat storage material 200. Note that after the heat storage material 200 is injected, the injection hole is closed with metal such as copper, stainless steel, and the like. In this way, the inside of the heat storage unit 10 is filled with the inorganic fiber sheets 100 and the heat storage material 200, and the inorganic fiber sheets 100 are connected to and in contact with both the housing portion 306 and the lid body portion 308. With such a configuration, heat can be transferred to the enclosed inorganic fiber sheets 100 from both the housing portion 306 and the lid body portion 308. As a result, the heat of the cooling medium outside the heat storage unit 10 can be easily transferred to the heat storage material 200 via the inorganic fiber sheets 100, and the heat stored in the heat storage material 200 can be easily transferred to the heating medium outside the heat storage unit 10 via the inorganic fiber sheets 100.

Note that in an example described above, the example in which a plurality of inorganic fiber sheets 100 is overlapped and filled in the housing portion 306 has been illustrated, but in a case where the thickness of the single inorganic fiber sheet 100 has about the depth of the housing portion 306, the single inorganic fiber sheet 100 can be used without overlapping a plurality of inorganic fiber sheets 100. In addition, in a case where the inorganic fiber sheet 100 has a plurality of thicknesses, the housing portion 306 can be filled by appropriately combining and overlapping the inorganic fiber sheets 100.

<<<Other Structures of Heat Storage Unit 10>>>

The examples of FIGS. 9A and 9B illustrate cases where the inorganic fiber sheet or sheets 100 as a whole are overlapped to be formed in a substantially rectangular parallelepiped shape. The shape of the entirety of the overlapped inorganic fiber sheet or sheets 100 is appropriately determined to be not only the substantially rectangular parallelepiped shape but also a shape according to the shape of the heat storage unit 10 (the shape of the housing portion 306). For example, the overlapped inorganic fiber sheet or sheets 100 as a whole can be made into a substantially cubic shape, a substantially cylindrical shape, a substantially polygonal columnar shape, or the like. In addition, the overlapped inorganic fiber sheet or sheets 100 as a whole can be made into a shape configured by a curved surface such as a spherical shape and an ellipsoid shape. Furthermore, the shape of the entirety of the overlapped inorganic fiber sheet or sheets 100 may be a shape formed by winding the inorganic fiber sheets 100 around a predetermined central axis (pipe or the like). Any shape may be used as long as the overlapping inorganic fiber sheets 100 are in contact with each other and heat can be easily transferred through the entire overlapping inorganic fiber sheet or sheets 100.

<<<Inorganic Fiber Mesh Body 150>>>

Figure 11:
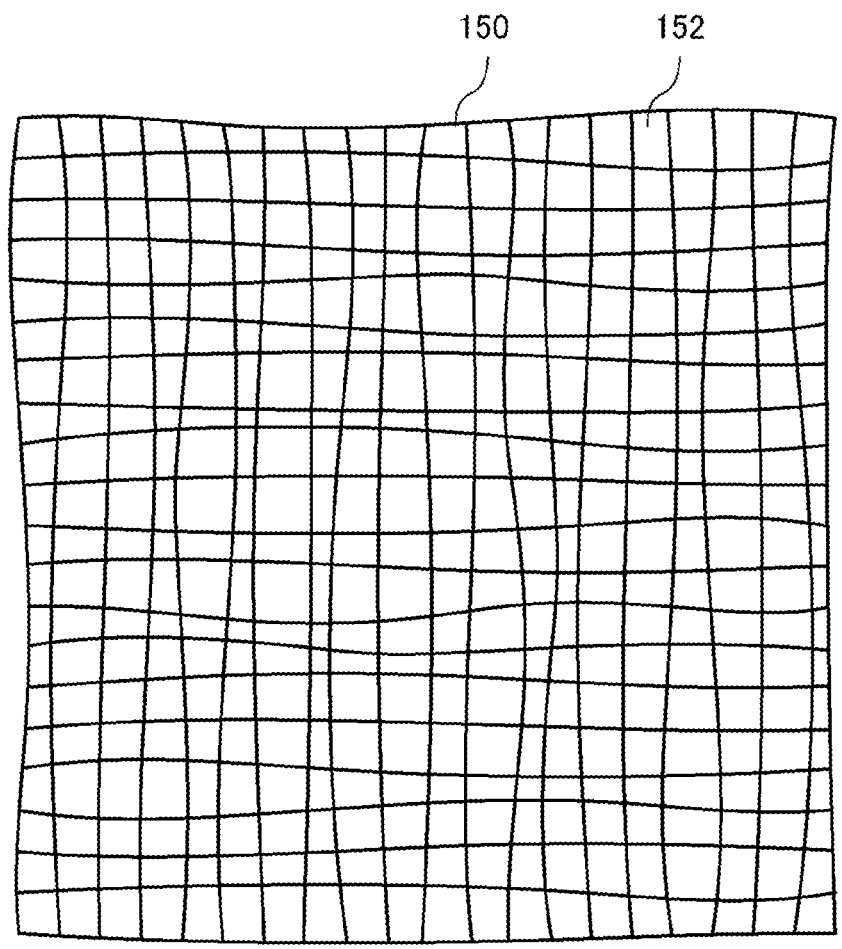
FIG. 11 is a plan view illustrating an inorganic fiber mesh body 150 having a mesh-like shape.

In an example described above, the inorganic fiber sheet 100 has the form of a fiber sheet, but may have another form as long as the inorganic fiber sheet 100 can transfer heat. FIG. 11 is a plan view illustrating an inorganic fiber mesh body 150 having a mesh shape. A black line illustrated in FIG. 11 is an elongated cable (yarn, line) including an inorganic fiber. The inorganic fiber mesh body 150 is formed by connecting a plurality of vertical cables and a plurality of horizontal cables at overlapping portions while being separated from each other.

By overlapping a plurality of inorganic fiber mesh bodies 150 and connecting contact portions by sintering, heat can be transferred through the entirety of the plurality of inorganic fiber mesh bodies 150, similarly to the inorganic fiber sheet 100. By forming a mesh shape, a large gap region 152 can be secured, the heat storage material 200 can be easily moved in the gap region 152, the heat storage material 200 can be easily inserted into a gap between the inorganic fibers, and can be easily brought into contact with the inorganic fiber mesh body 150. Note that space factors of both the inorganic fiber sheet 100 and the inorganic fiber mesh body 150 are approximately 4% to 6%.

<<<Arrangement of Heat Storage Unit 10 with Respect to Member>>>

As described above, the heat storage unit 10 has the inorganic fiber sheet 100 and the heat storage material 200. Here, the heat storage unit 10 has the housing 300 (housings 300A to 300D).

<<<Case where Heat Storage Unit 10A is Arranged on Single Cylindrical Pipe PI1>

Figure 12:
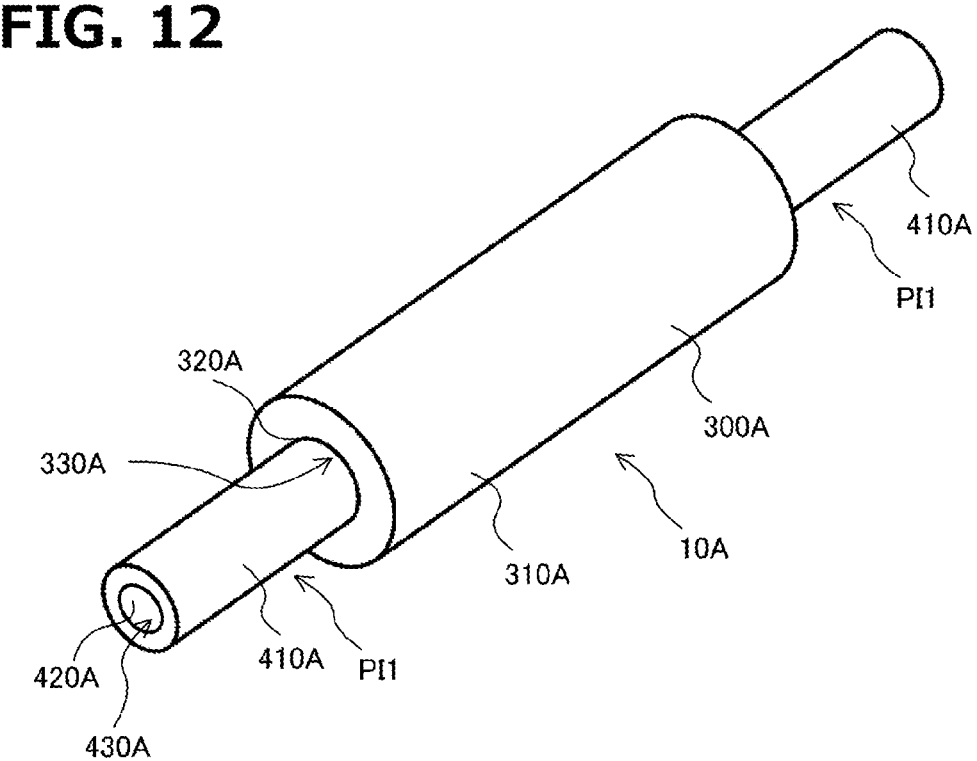
FIG. 12 is a perspective view illustrating an example in which a heat storage unit 10A is arranged on a single pipe PI1 formed in a substantially cylindrical shape.

FIG. 12 is a perspective view illustrating an example in which the heat storage unit 10A is arranged on a single pipe PI1 formed in a substantially cylindrical shape. The heat storage unit 10A has the housing 300A.

<Pipe PI1>

The pipe PI1 is formed in an elongated cylindrical shape, and a through hole 430A is formed along a longitudinal direction. The pipe PI1 has an outer peripheral surface 410A and an inner peripheral surface 420A. The outer shape of the pipe PI1 is defined by the outer peripheral surface 410A. The through hole 430A is defined by the inner peripheral surface 420A. A heating medium such as a cooling medium and a warming medium can flow through the through hole 430A. The pipe PI1 is formed of metal, resin, or the like.

<Heat Storage Unit 10A>

The heat storage unit 10A has the housing 300A formed in an elongated cylindrical shape, and a through hole 330A is formed along a longitudinal direction. The housing 300A of the heat storage unit 10A has an outer peripheral surface 310A and an inner peripheral surface 320A. The outer shape of the housing 300A of the heat storage unit 10A is defined by the outer peripheral surface 310A. The through hole 330A is defined by the inner peripheral surface 320A. The heat storage unit 10A has an inner diameter slightly larger than the outer diameter of the pipe PI1. The pipe PI1 is positioned in the through hole 330A of the heat storage unit 10A. The inner peripheral surface 320A of the housing 300A of the heat storage unit 10A can be in close contact with the outer peripheral surface 410A of the pipe PI1.

<Type of Contact and Form of Inorganic Fiber Sheet 100>

In the heat storage unit 10A illustrated in FIG. 12, as the forms of the inorganic fiber sheet 100, a spiral shape, a scroll shape (spiral spring shape) (see FIG. 25) to be described later, and the like can be used. In addition, the type of contact between the inorganic fiber sheet 100 and the heat storage material 200 may be any of the embedded type, the impregnated type, the supported type, and the layered type. The heat storage material 200 can be provided between the outer peripheral surface 410A of the pipe PI1 and the inorganic fiber sheet 100 wound in a spiral shape. In addition, the heat storage material 200 can be provided on the outer peripheral side of the inorganic fiber sheet 100 wound in a spiral shape. Furthermore, the heat storage material 200 can be arranged in a region between the inorganic fiber sheets 100 wound in a scroll shape (spiral spring shape) and adjacent to each other. With such a configuration, the entire amount of the heat storage material 200 can be increased. Note that as the forms of the inorganic fiber sheet 100, not only a spiral shape and a scroll shape (spiral spring shape) but also a flat shape, an uneven shape, a layered shape, and the like can be appropriately used according to the size of the housing 300A.

Heat exchange between a heating medium flowing through the pipe PI1 and the heat storage material 200 is performed via the pipe PI1, the housing 300A, and the inorganic fiber sheet 100. The heat of the heating medium is stored in the heat storage material 200 via the pipe PI1, the housing 300A, and the inorganic fiber sheet 100, and the heat stored in the heat storage material 200 is transferred to the heating medium via the pipe PI1, the housing 300A, and the inorganic fiber sheet 100. Note that heat exchange with the heat storage material 200 can be performed via the pipe PI1 and the housing 300A without passing through the inorganic fiber sheet 100.

Furthermore, the periphery of the housing 300A is preferably covered with a heat insulating material. Specifically, the periphery of the housing 300A is covered with a heat insulating material that entirely surrounds and is in close contact with the housing 300A. By using the heat insulating material, heat can be prevented from being transferred to the outside, and heat exchange can be efficiently performed between the heat storage material 200 and a heating medium such as a cooling medium and a warming medium flowing through the pipe PI1.

In addition, the inorganic fiber sheet 100 is preferably arranged so as to be in contact with the pipe PI1 in the pipe PI1. Heat can be more efficiently exchanged between the heat storage material 200 and the heating medium such as a cooling medium and a warming medium flowing through the pipe PI1.

<<Case where Heat Storage Unit 10B is Arranged Around a Plurality of Cylindrical Pipes PI1>>

Figure 13:
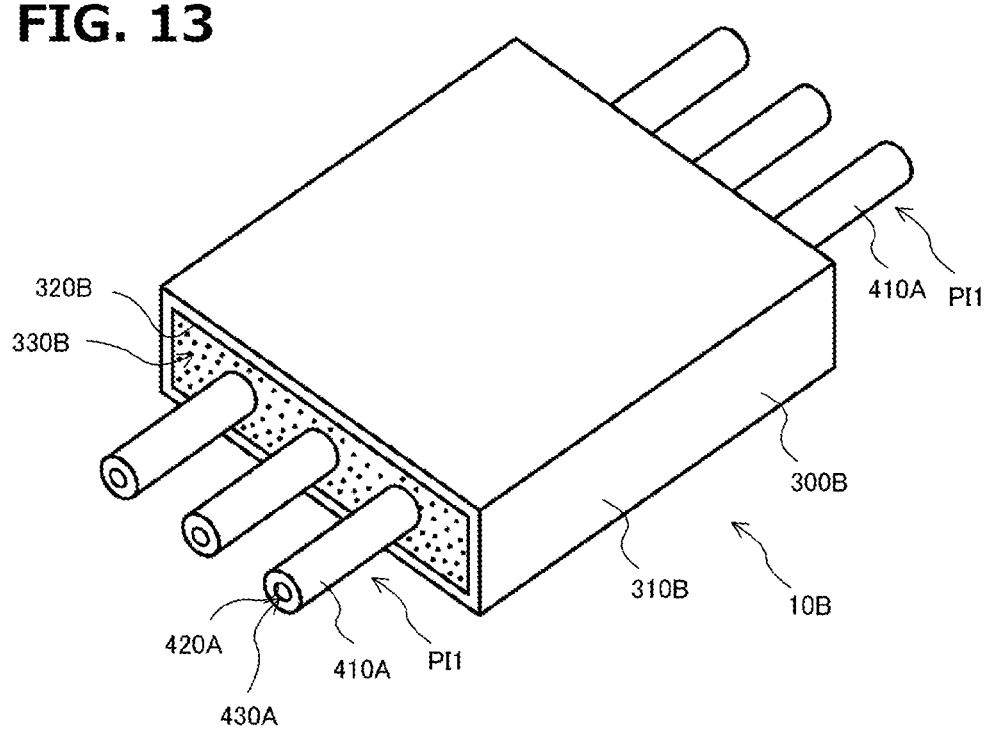
FIG. 13 is a perspective view illustrating an example in which a heat storage unit 10B is arranged around three pipes PI1 formed in a cylindrical shape.

FIG. 13 is a perspective view illustrating an example in which a heat storage unit 10B is arranged around three pipes PI1 formed in a cylindrical shape. The heat storage unit 10B has a housing 300B. Note that the number of pipes PI1 is not limited to three, and may be any number as long as the number is plural.

<Pipe PI1>

Each of the pipes PI1 is the same as a pipe illustrated in FIG. 12. A heating medium such as a cooling medium and a warming medium can flow through the through hole 430A formed in each of the pipes PI1. The three pipes PI1 have the same thickness, and are arranged substantially in parallel and at equal intervals while being separated from each other.

<Heat Storage Unit 10B>

The heat storage unit 10B has the housing 300B formed in a substantially quadrangular cylindrical shape along the longitudinal direction of the three pipes PI1, and a through hole 330B is formed along the longitudinal direction of the pipe PI1. The heat storage unit 10B can collectively cover the three pipes PI1. The heat storage unit 10B has an outer peripheral surface 310B and an inner peripheral surface 320B. The outer shape of the housing 300B of the heat storage unit 10B is defined by the outer peripheral surface 310B. The through hole 330B is defined by the inner peripheral surface 320B. The cross section of the through hole 330B of the heat storage unit 10B is larger than the cross sections of the three pipes PI1. The three pipes PI1 are arranged in parallel in the through hole 330B of the heat storage unit 10B. In the through hole 330B of the heat storage unit 10B, the three pipes PI1 are arranged to be separated from each other, and are arranged to be separated also from the inner peripheral surface 320B of the heat storage unit 10B.

<Type of Contact and Form of Inorganic Fiber Sheet 100>

In the heat storage unit 10B illustrated in FIG. 13, as the forms of the inorganic fiber sheet 100, the spiral shape, the scroll shape (spiral spring shape) (see FIG. 25) to be described later, and the like can be used. The inorganic fiber sheet 100 can be wound in a spiral shape around each of the three pipes PI1 or wound in a scroll shape (spiral spring shape). In addition, the type of contact between the inorganic fiber sheet 100 and the heat storage material 200 may be any of the embedded type, the impregnated type, the supported type, and the layered type.

As in FIG. 12, the heat storage material 200 can be provided between the outer peripheral surface 410A of each of the pipes PI1 and the inorganic fiber sheet 100 wound in a spiral shape. In addition, the heat storage material 200 can be provided on the outer peripheral side of the inorganic fiber sheet 100 wound in a spiral shape. Furthermore, the heat storage material 200 can be arranged in a region between the inorganic fiber sheets 100 wound in a scroll shape (spiral spring shape) and adjacent to each other. With such a configuration, the entire amount of the heat storage material 200 can be increased. Note that as the forms of the inorganic fiber sheet 100, not only the spiral shape and the scroll shape (spiral spring shape) but also the flat shape, the uneven shape, the layered shape, and the like can be appropriately used according to the size of the housing 300B.

In addition, the inorganic fiber sheet 100 can also be arranged in a region between the three pipes PI1 arranged to be separated from each other. The inorganic fiber sheet 100 is preferably arranged continuously throughout the entire through hole 330B. By continuously arranging the inorganic fiber sheet 100, heat can be efficiently conducted.

Note that in the heat storage unit 10B illustrated in FIG. 13, the three pipes PI1 are arranged in parallel along one stage is illustrated, but a plurality of pipes PI1 may be arranged in parallel along each of a plurality of stages.

Heat exchange between the heat storage material 200 and the heating medium flowing through the three pipes PI1 is performed via each of the pipes PI1, the housing 300B, and the inorganic fiber sheet 100. The heat of the heating medium is stored in the heat storage material 200 via the pipe PI1, the housing 300B, and the inorganic fiber sheet 100, and the heat stored in the heat storage material 200 is transferred to the heating medium via the pipe PI1, the housing 300B, and the inorganic fiber sheet 100. Note that heat exchange with the heat storage material 200 can be performed via the pipe PI1 and the housing 300B without passing through the inorganic fiber sheet 100.

Furthermore, the periphery of the housing 300B is preferably covered with a heat insulating material. Specifically, the periphery of the housing 300B is covered with a heat insulating material that entirely surrounds and is in close contact with the housing 300B. By using the heat insulating material, heat can be prevented from being transferred to the outside, and heat exchange can be efficiently performed between the heat storage material 200 and a heating medium such as a cooling medium and a warming medium flowing through the pipe PI1.

In addition, the inorganic fiber sheet 100 is preferably arranged so as to be in contact with the pipe PI1 in the pipe PI1. Heat can be more efficiently exchanged between the heat storage material 200 and the heating medium such as a cooling medium and a warming medium flowing through the pipe PI1.

<<Case where Heat Storage Unit 10C is Arranged Along Outer Side of Rectangular Cylindrical Pipe PI2>>

Figure 14:
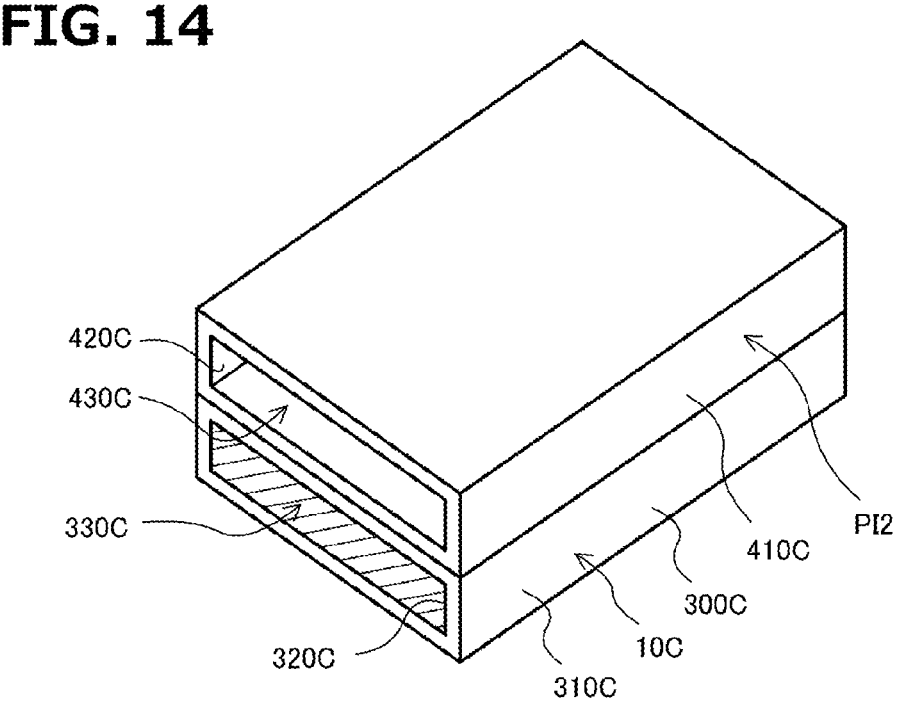
FIG. 14 is a perspective view illustrating an example in which a heat storage unit 10C is arranged along a pipe PI2 formed in a substantially rectangular cylindrical shape outside the pipe PI2.

FIG. 14 is a perspective view illustrating an example in which the heat storage unit 10C is arranged along a pipe PI2 formed in a substantially rectangular cylindrical shape outside the pipe PI2. The heat storage unit 10C has a housing 300C.

<Pipe PI2>

The pipe PI2 is formed in an elongated rectangular cylindrical shape, and a through hole 430C is formed along a longitudinal direction. The pipe PI2 has a first surface 410C and a second surface 420C. The outer shape of the pipe PI2 is defined by the first surface 410C. The through hole 430C is defined by the second surface 420C. A heating medium such as a cooling medium and a warming medium can flow through the through hole 430C. The pipe PI2 is formed of metal, resin, or the like.

<Heat Storage Unit 10C>

The heat storage unit 10C has the housing 300C formed in an elongated rectangular cylindrical shape, and a through hole 330C is formed along a longitudinal direction. The housing 300C of the heat storage unit 10C has a first surface 310C and a second surface 320C. The outer shape of the housing 300C of the heat storage unit 10C is defined by the first surface 310C. The through hole 330C is defined by the second surface 320C. The width of the housing 300C of the heat storage unit 10C (length of the pipe PI2 in a transverse direction) is the same as the width of the pipe PI1 (length in the transverse direction). In an example illustrated in FIG. 14, arrangement is made so that the upper surface of the housing 300C of the heat storage unit 10C is in close contact with the lower surface of the pipe PI2. As described above, in the example illustrated in FIG. 14, the first surface 410C of the pipe PI2 and the first surface of the housing 300C of the heat storage unit 10C are in contact with each other to perform heat exchange.

<Type of Contact and Form of Inorganic Fiber Sheet 100>

In the heat storage unit 10C illustrated in FIG. 14, as the forms of the inorganic fiber sheet 100, the flat shape (see FIG. 20), the layered shape (see FIG. 26) to be described later, and the like can be used. In addition, the type of contact between the inorganic fiber sheet 100 and the heat storage material 200 may be any of the embedded type, the impregnated type, the supported type, and the layered type. The heat storage material 200 can be provided between the first surface 310C or the second surface 320C of the housing 300C and the inorganic fiber sheet 100 in a flat shape. In addition, the heat storage material 200 can be provided in a region between the inorganic fiber sheets 100 formed in a layered shape. With such a configuration, the entire amount of the heat storage material 200 can be increased. Note that as the forms of the inorganic fiber sheet 100, not only the flat shape and the layered shape but also the spiral shape, the scroll shape (spiral spring shape), the uneven shape, and the like can be appropriately used according to the size of the housing 300C.

Heat exchange between a heating medium flowing through the pipe PI2 and the heat storage material 200 is performed via the pipe PI2, the housing 300C, and the inorganic fiber sheet 100. The heat of the heating medium is stored in the heat storage material 200 via the pipe PI2, the housing 300C, and the inorganic fiber sheet 100, and the heat stored in the heat storage material 200 is transferred to the heating medium via the pipe PI2, the housing 300C, and the inorganic fiber sheet 100. Note that heat exchange with the heat storage material 200 can be performed via the pipe PI2 and the housing 300C without passing through the inorganic fiber sheet 100.

Furthermore, the periphery of the housing 300C and the pipe PI2 is preferably covered with a heat insulating material. Specifically, the periphery of the housing 300C and the pipe PI2 is covered with a heat insulating material that entirely surrounds and is in close contact with the housing 300C and the pipe PI2. By using the heat insulating material, heat can be prevented from being transferred to the outside, and heat exchange can be efficiently performed between the heat storage material 200 and a heating medium such as a cooling medium and a warming medium flowing through the pipe PI2.

In addition, the inorganic fiber sheet 100 is preferably arranged so as to be in contact with the pipe PI2 in the pipe PI2. Heat can be more efficiently exchanged between the heat storage material 200 and the heating medium such as a cooling medium and a warming medium flowing through the pipe PI2.

<<Case where Heat Storage Unit 10 is Arranged Inside Rectangular Cylindrical Pipe>>

Figure 15:
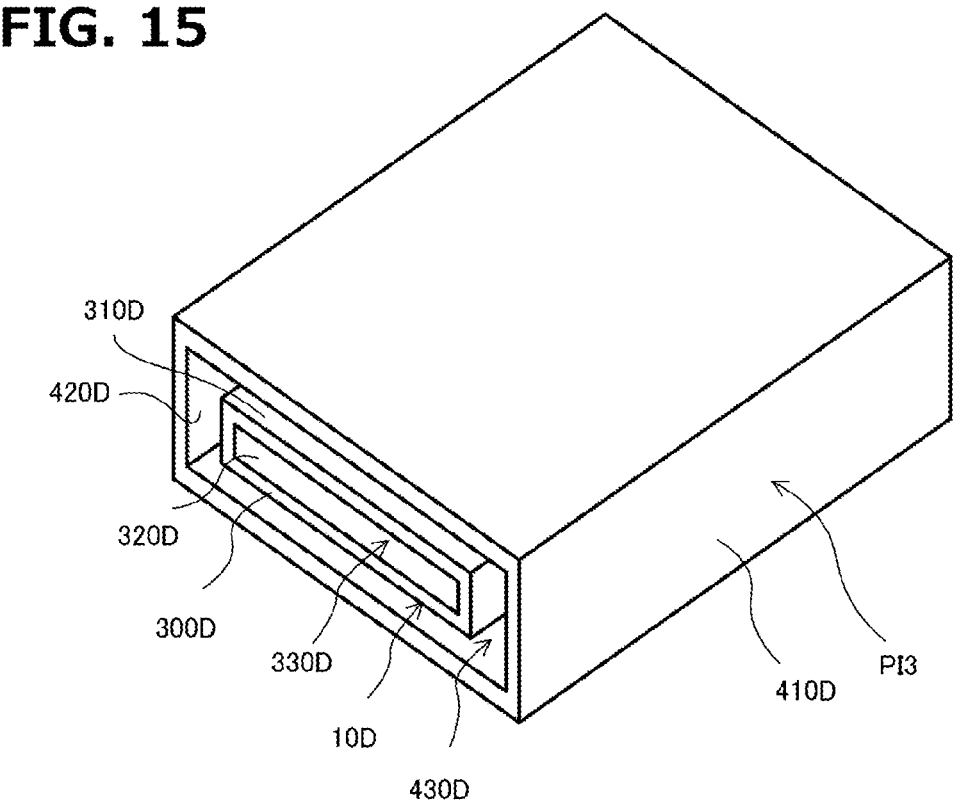
FIG. 15 is a perspective view illustrating an example in which a heat storage unit 10D is arranged along a pipe PI3 formed in a rectangular cylindrical shape inside the pipe PI3.

FIG. 15 is a perspective view illustrating an example in which a heat storage unit 10D is arranged along a pipe PI3 formed in a rectangular cylindrical shape inside the pipe PI3. The heat storage unit 10D has a housing 300D.

<Pipe PI3>

The pipe PI3 is formed in an elongated rectangular cylindrical shape, and a through hole 430D is formed along a longitudinal direction. The pipe PI3 has an outer peripheral surface 410D and an inner peripheral surface 420D. The outer shape of the pipe PI3 is defined by the outer peripheral surface 410D. The through hole 430D is defined by the inner peripheral surface 420D. The heating medium such as a cooling medium and a warming medium can flow through the through hole 430D. Note that as will be described later, the heat storage unit 10D is also arranged in the through hole 430D. The pipe PI3 is formed of metal, resin, or the like.

<Heat Storage Unit 10D>

The heat storage unit 10D has the housing 300D formed in an elongated rectangular cylindrical shape, and a through hole 330D is formed along a longitudinal direction. The housing 300D of the heat storage unit 10D has an outer peripheral surface 310D and an inner peripheral surface 320D. The outer shape of the housing 300D of the heat storage unit 10D is defined by the outer peripheral surface 310D. The through hole 330D is defined by the inner peripheral surface 320D. The width (length of the pipe PI3 in a transverse direction) and height of the outer peripheral surface 410D of the housing 300D of the heat storage unit 10D are smaller than the width (length in the transverse direction) and height of the pipe PI3, respectively. In an example illustrated in FIG. 15, the entire heat storage unit 10D is accommodated inside the pipe PI3. With this configuration, the entire outer peripheral surface 310D of the housing 300D of the heat storage unit 10D can be in contact with a heating medium flowing through the pipe PI3, and the efficiency of heat exchange can be enhanced.

<Type of Contact and Form of Inorganic Fiber Sheet 100>

In the heat storage unit 10D illustrated in FIG. 15, as the forms of the inorganic fiber sheet 100, the flat shape (see FIG. 20), the layered shape (see FIG. 26) to be described later, and the like can be used. In addition, the type of contact between the inorganic fiber sheet 100 and the heat storage material 200 may be any of the embedded type, the impregnated type, the supported type, and the layered type. The heat storage material 200 can be provided between the inner peripheral surface 320D of the housing 300D and the inorganic fiber sheet 100 in a flat shape. In addition, the heat storage material 200 can be provided in a region between the inorganic fiber sheets 100 formed in a layered shape. Note that as the forms of the inorganic fiber sheet 100, not only the flat shape and the layered shape but also the spiral shape, the scroll shape (spiral spring shape), the uneven shape, and the like can be appropriately used according to the size of the housing 300D.

Heat exchange between the heating medium flowing through the pipe PI3 and the heat storage material 200 is performed via the housing 300D and the inorganic fiber sheet 100. The heat of the cooling medium is transferred to the heat storage material 200 via the housing 300D and the inorganic fiber sheet 100, and the heat stored in the heat storage material 200 is transferred to the heating medium via the housing 300D and the inorganic fiber sheet 100. As described above, with a configuration so as to accommodate the heat storage unit 10D inside the pipe PI3, heat exchange can be performed without passing through the pipe PI3, and the efficiency of heat exchange can be enhanced. Note that also in this case, heat exchange with the heat storage material 200 can be performed via the housing 300D without passing through the inorganic fiber sheet 100.

Furthermore, the periphery of the pipe PI3 is preferably covered with a heat insulating material. Specifically, the periphery of the pipe PI3 is covered with a heat insulating material that entirely surrounds and is in close contact with the pipe PI3. By using the heat insulating material, heat can be prevented from being transferred to the outside, and heat exchange can be efficiently performed between the heat storage material 200 and a heating medium such as a cooling medium and a warming medium flowing through the pipe PI3.

In addition, the inorganic fiber sheet 100 is preferably arranged so as to be in contact with the pipe PI3 in the pipe PI3. Heat can be more efficiently exchanged between the heat storage material 200 and the heating medium such as a cooling medium and a warming medium flowing through the pipe PI3.

<<Case where Heat Storage Unit 10 is Arranged while being Sandwiched Along Outer Side of Rectangular Cylindrical Pipe>>

Figure 16:
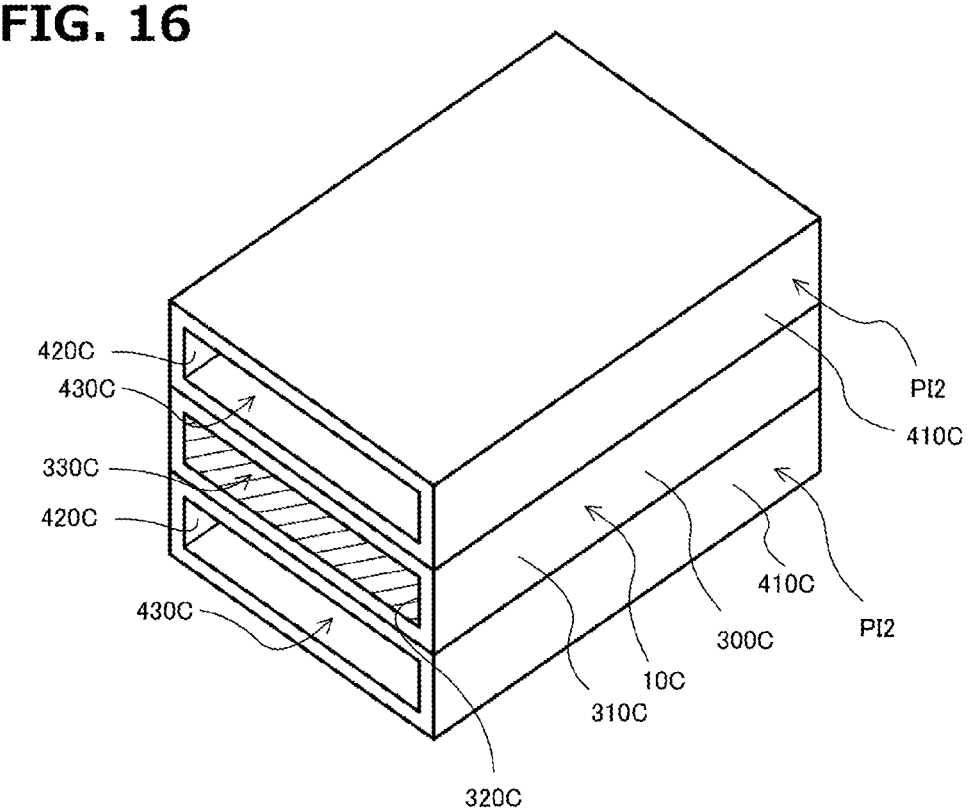
FIG. 16 is a perspective view illustrating an example in which the heat storage unit 10C is arranged along a pipe PI2 formed in a rectangular tube shape outside the pipe PI2.

FIG. 16 is a perspective view illustrating an example in which the heat storage unit 10C is arranged along the pipe PI2 formed in a rectangular cylindrical shape outside the pipe PI2, similarly to FIG. 14. FIG. 14 illustrates an example in which the pipe PI2 is arranged only on one surface constituting the outer periphery of the heat storage unit 10C, but in FIG. 16, the pipe PI2 is arranged on two surfaces of the outer periphery of the heat storage unit 10C. Since heat transfer is performed using the two surfaces of the outer periphery, efficiency can be increased, and heat transfer can be quickly performed.

Heat transfer between the heating medium flowing through the pipe PI2 and the heat storage material 200 is performed via the pipe PI2, the housing 300C, and the inorganic fiber sheet 100. The heat of the cooling medium is transferred to the heat storage material 200 via the pipe PI2, the housing 300C, and the inorganic fiber sheet 100, and heat stored in the heat storage material 200 is transferred to the heating medium via the pipe PI2, the housing 300C, and the inorganic fiber sheet 100. Note that heat transfer with the heat storage material 200 can be performed via the pipe PI2 and the housing 300C without passing through the inorganic fiber sheet 100.

Furthermore, the periphery of the housing 300C and two pipes PI2 is preferably covered with a heat insulating material. Specifically, the periphery of the housing 300C and the two pipes PI2 is covered with a heat insulating material that entirely surrounds and is in close contact with the housing 300C and two pipes PI2. By using the heat insulating material, heat can be prevented from being transferred to the outside, and heat exchange can be efficiently performed between the heat storage material 200 and a heating medium such as a cooling medium and a warming medium flowing through the two pipes PI2.

In addition, the inorganic fiber sheet 100 is preferably arranged so as to be in contact with the pipes PI2 inside each of the two pipes PI2. Heat can be more efficiently exchanged between the heat storage material 200 and the heating medium such as a cooling medium and a warming medium flowing through the pipe PI2.

<<<<Application of Heat Storage Unit 10>>>>

As described above, the heat storage unit 10 is attached to the member such as a pipe, and heat exchange can be performed between the heat storage material 200 and the heating medium.

<<Configuration of Temperature Adjustment Device 600>>

FIG. 17 is a schematic diagram illustrating a configuration of the temperature adjustment device 600 for adjusting a workpiece (object) to a predetermined temperature. Note that in FIG. 17, a valve, a check valve, a pump, and the like are omitted for convenience. The opening and closing of the valve and the flow rate of the heating medium can be appropriately adjusted. The temperature adjustment device 600 has the high-temperature chiller 610, the low-temperature chiller 620, and the workpiece temperature control unit 630, and supplies a mixed heating medium obtained by mixing a warming medium sent from the high-temperature chiller 610 and a cooling medium sent from the low-temperature chiller 620 to the workpiece temperature control unit 630, and adjusts the workpiece to a desired temperature in the workpiece temperature control unit 630.

The high-temperature chiller 610 is connected to the pipe 702, and can send a warming medium having a predetermined high temperature from the pipe 702. The pipe 702 is connected to the branching portion 752. The branching portion 752 is also connected to a pipe 703 and a pipe 720. The branching portion 752 has a valve (not illustrated). The pipe 702 may be communicated with only one of the pipe 703 and the pipe 720 by opening or closing a valve of the branching portion 752, or the pipe 702 may be communicated with both the pipe 703 and the pipe 720 by appropriately adjusting the opening degree of the valve of the branching portion 752, and flow rate control of a flow rate to the pipe 703 and a flow rate to the pipe 720 may be performed. The warming medium sent from the high-temperature chiller 610 is sent to either the pipe 703 or the pipe 720 by the operation of the valve of the branching portion 752.

The low-temperature chiller 620 is connected to a pipe 704, and can send a warming medium having a predetermined low temperature lower than a predetermined high temperature from the pipe 704. The pipe 704 is connected to a branching portion 754. The branching portion 754 is also connected to a pipe 705 and a pipe 722. The branching portion 754 has a valve (not illustrated). The pipe 704 may be communicated with only one of the pipe 705 and the pipe 722 by opening or closing a valve of the branching portion 754, or the pipe 704 may be communicated with both the pipe 705 and the pipe 722 by appropriately adjusting the opening degree of the valve of the branching portion 754, and flow rate control of a flow rate to the pipe 705 and a flow rate to the pipe 722 may be performed. The cooling medium sent from the low-temperature chiller 620 is sent to either the pipe 705 or the pipe 722 by the operation of the valve of the branching portion 754.

The pipe 703 and the pipe 705 are connected to a mixing unit 760. The mixing unit 760 is connected to a pipe 706. The pipe 706 is connected to the workpiece temperature control unit 630. The warming medium sent from the high-temperature chiller 610 and the cooling medium sent from the low-temperature chiller 620 are mixed in the mixing unit 760 to become a mixed medium, and the mixed medium is supplied to the workpiece temperature control unit 630 via the pipe 706.

The workpiece temperature control unit 630 has an installation table (not illustrated) on which the workpiece can be installed. The installation table is configured so that the mixed medium supplied via the pipe 706 and the workpiece can exchange heat with each other, and the temperature of the workpiece can be adjusted according to the mixed medium.

The workpiece temperature control unit 630 is connected to the pipe 708. In the workpiece temperature control unit 630, the mixed medium having finished exchanging heat with the workpiece is sent to the pipe 708. The pipe 708 is connected to a branching portion 762. The branching portion 762 is connected to a pipe 710 and a pipe 714. The mixed medium reaching the branching portion 762 via the pipe 708 is branched into the pipe 710 and the pipe 714 at the branching portion 762.

As described above, the branching portion 752 branches into the pipe 703 and the pipe 720. The pipe 710 and the pipe 720 are connected to a merging portion 772. Furthermore, a pipe 724 is connected to the merging portion 772. The merging portion 772 has a valve (not illustrated). Only one of the pipe 710 and the pipe 720 may be selected and communicated with the pipe 724 by opening or closing a valve of the merging portion 772, or both the pipe 710 and the pipe 720 may be communicated with the pipe 724 by appropriately adjusting the opening degree of the valve of the merging portion 772, and flow rate control of a flow rate from the pipe 710 and a flow rate from the pipe 720 may be performed. When the pipe 710 communicates with the pipe 724 by the operation of the valve of the merging portion 772, the pipe 710 is connected to the high-temperature heat storage unit 640 via the merging portion 772 and the pipe 724, and the high-temperature heat storage unit 640 is connected to the high-temperature chiller 610 via a pipe 712. In addition, when the pipe 720 communicates with the pipe 724 by the operation of the valve of the merging portion 772, the high-temperature heat storage unit 640 can be regenerated.

As described above, the branching portion 754 branches into the pipe 705 and the pipe 722. The pipe 714 and the pipe 722 are connected to the merging portion 774. Furthermore, a pipe 726 is connected to the merging portion 774. The merging portion 774 has a valve (not illustrated). Only one of the pipe 714 and the pipe 722 may be selected and communicated with the pipe 726 by opening or closing the valve of the merging portion 774, or both the pipe 714 and the pipe 722 may be communicated with the pipe 726 by appropriately adjusting the opening degree of the valve of the merging portion 774, and the flow rate control of a flow rate from the pipe 714 and a flow rate from the pipe 722 may be performed. When the pipe 714 communicates with the pipe 726 by the operation of the valve of the merging portion 774, the pipe 714 is connected to the low-temperature heat storage unit 650 via the merging portion 774 and the pipe 726, and the low-temperature heat storage unit 650 is connected to the low-temperature chiller 620 via a pipe 716. In addition, when the pipe 722 communicates with the pipe 726 by the operation of the valve of the merging portion 774, the low-temperature heat storage unit 650 can be regenerated.

<High-Temperature Heat Storage Unit 640>

As described above, when the pipe 710 communicates with the pipe 724 by the operation of the valve of the merging portion 772, the pipe 710 is connected to the high-temperature heat storage unit 640. The mixed medium sent from the branching portion 762 to the pipe 710 is supplied to the high-temperature heat storage unit 640 as a reflux medium. The high-temperature heat storage unit 640 has the heat storage unit 10 described above, and has the inorganic fiber sheet 100 and the heat storage material 200. Heat exchange can be performed between the heat storage material 200 of the high-temperature heat storage unit 640 and the reflux medium flowing through the pipe 710.

As described above, the warming medium sent from the high-temperature chiller 610 is mixed with the cooling medium sent from the low-temperature chiller 620 in the mixing unit 760 to become a mixed medium. The temperature of the mixed medium becomes lower than the temperature of the warming medium sent from the high-temperature chiller 610 by mixing with the cooling medium. Therefore, the temperature of the reflux medium flowing through the pipe 710 also decreases. In a case where the high-temperature heat storage unit 640 is not provided, the reflux medium having a low temperature returns to the high-temperature chiller 610, and a burden on the high-temperature chiller 610 for increasing the temperature of the reflux medium to a predetermined high temperature of the reflux medium by the high-temperature chiller 610 inevitably increases.

Thus, by providing the high-temperature heat storage unit 640 in a flow path before the reflux medium returns to the high-temperature chiller 610, heat stored in the heat storage material 200 of the high-temperature heat storage unit 640 is transferred to the reflux medium, and the temperature of the reflux medium can be increased in advance. The burden on the high-temperature chiller 610 can be reduced by increasing the temperature of the reflux medium before the reflux medium returns to the high-temperature chiller 610. By providing the high-temperature heat storage unit 640, it becomes unnecessary to use the capacity of the high-temperature chiller 610 to the maximum, it is possible to provide a margin for the operation of the high-temperature chiller 610, it is possible to provide a low-capacity high-temperature chiller 610, and it is possible to save power consumption of the temperature adjustment device 600.

<Low-Temperature Heat Storage Unit 650>

As described above, when the pipe 714 communicates with the pipe 726 by the operation of the valve of the merging portion 774, the pipe 714 is connected to the low-temperature heat storage unit 650. The mixed medium sent from the branching portion 762 to the pipe 714 is supplied to the low-temperature heat storage unit 650 as a reflux medium. The low-temperature heat storage unit 650 has the heat storage unit 10 described above, and has the inorganic fiber sheet 100 and the heat storage material 200. Heat exchange can be performed between the heat storage material 200 of the low-temperature heat storage unit 650 and the reflux medium flowing through the pipe 714.

As described above, the cooling medium sent from the low-temperature chiller 620 is mixed with the warming medium sent from the high-temperature chiller 610 in the mixing unit 760 to become a mixed medium. Due to the mixing with the warming medium, the temperature of the mixed medium becomes higher than the temperature of the cooling medium sent from the low-temperature chiller 620. Therefore, the temperature of the reflux medium flowing through the pipe 714 also increases. When the low-temperature heat storage unit 650 is not provided, the reflux medium having a high temperature returns to the low-temperature chiller 620, and a burden on the low-temperature chiller 620 for decreasing the temperature of the reflux medium to a predetermined low temperature by the low-temperature chiller 620 inevitably increases.

Thus, by providing the low-temperature heat storage unit 650 in a flow path before the reflux medium returns to the low-temperature chiller 620, the heat of the reflux medium is transferred to the heat storage material 200 of the low-temperature heat storage unit 650, and the temperature of the reflux medium can be decreased in advance. By decreasing the temperature of the reflux medium before the reflux medium returns to the low-temperature chiller 620, the burden on the low-temperature chiller 620 can be reduced. By providing the low-temperature heat storage unit 650, it becomes unnecessary to use the capacity of the low-temperature chiller 620 to the maximum, it is possible to provide a margin for the operation of the low-temperature chiller 620, it is possible to use a low-capacity low-temperature chiller 620, and it is possible to save power consumption of the temperature adjustment device 600.

<<Normal Operation State>>

FIG. 17 illustrates a flow path of the heating medium when the high-temperature chiller 610 and the low-temperature chiller 620 operate steadily and the high-temperature heat storage unit 640 and the low-temperature heat storage unit 650 operate normally. In FIG. 17, a flow of the heating medium is illustrated by a black arrow. In a normal operation state, the valve of the branching portion 752 operates so that the pipe 702 and the pipe 703 communicate with each other, and the valve of the branching portion 754 operates so that the pipe 704 and the pipe 705 communicate with each other. The valve of the merging portion 772 operates so that the pipe 710 and the pipe 724 communicate with each other, and the valve of the merging portion 774 operates so that the pipe 714 and the pipe 726 communicate with each other.

The high-temperature chiller 610 can send a warming medium having a predetermined high temperature, for example, 80° C. from the pipe 702. Meanwhile, the low-temperature chiller 620 can send a cooling medium having a predetermined low temperature lower than a predetermined high temperature, for example, −20° C. from the pipe 704.

The valve of the branching portion 752 operates so that the pipe 702 and the pipe 703 communicate with each other, and the warming medium sent from the high-temperature chiller 610 flows through the pipe 702 and the pipe 703. In addition, the valve of the branching portion 754 operates so that the pipe 704 and the pipe 705 communicate with each other, and the cooling medium sent from the low-temperature chiller 620 flows through the pipe 704 and the pipe 705.

The warming medium sent from the high-temperature chiller 610 and then flowing through the pipe 702 and the pipe 703 and the cooling medium sent from the low-temperature chiller 620 and then flowing through the pipe 704 and the pipe 705 are mixed in the mixing unit 760 to become a mixed medium having a desired temperature. Note that the flow rate of the warming medium sent from the high-temperature chiller 610 and the flow rate of the cooling medium sent from the low-temperature chiller 620 are appropriately adjusted by a valve (not illustrated) or the like, and a mixed medium having a desired flow rate at a desired temperature can be obtained. The mixed medium flows through the pipe 706 and is supplied to the workpiece temperature control unit 630. In the workpiece temperature control unit 630, heat exchange can be performed between the mixed medium and the workpiece, and the workpiece can be adjusted to a desired temperature by the mixed medium.

The mixed medium supplied to the workpiece temperature control unit 630 passes through the pipe 708 and is branched by the branching portion 762 to become a reflux medium flowing through the pipe 710 and the pipe 714. The reflux medium flowing through the pipe 710 is supplied to the high-temperature heat storage unit 640, and the temperature of the reflux medium is increased by heat exchange between the heat storage material 200 of the high-temperature heat storage unit 640 and the reflux medium. The reflux medium having an increased temperature is returned to the high-temperature chiller 610 via the pipe 712. The reflux medium flowing through the pipe 714 is supplied to the low-temperature heat storage unit 650, and the temperature of the reflux medium is decreased by heat exchange between the heat storage material 200 of the low-temperature heat storage unit 650 and the reflux medium. The reflux medium having a decreased temperature is returned to the low-temperature chiller 620 via the pipe 716.

<<Regeneration Operation State of High-Temperature Heat Storage Unit 640>>

As described above, in the normal operation state, the heat storage material 200 of the heat storage unit 10 constituting the high-temperature heat storage unit 640 is used to increase the temperature of the reflux medium by performing heat exchange with the reflux medium having a decreased temperature. By the heat exchange with the reflux medium, the heat storage material 200 is gradually deprived of heat, and the temperature decreases. When the temperature of heat storage material 200 decreases, heat exchange with the reflux medium cannot be sufficiently performed, and it becomes difficult to increase the temperature of the reflux medium. Therefore, when the temperature of heat storage material 200 decreases, it is necessary to perform regeneration operation for storing heat in heat storage material 200. Here, the warming medium sent from the high-temperature chiller 610 is supplied to the high-temperature heat storage unit 640 by switching a flow path of the warming medium, and heat is stored in the heat storage material 200 of the high-temperature heat storage unit 640, whereby the high-temperature heat storage unit 640 is regenerated.

FIG. 18 is a diagram illustrating a flow path for regenerating the high-temperature heat storage unit 640. Also in FIG. 18, a valve, a check valve, a pump, and the like are omitted for convenience. The opening and closing of the valve and the flow rate of the heating medium can be appropriately adjusted. A flow of heating medium is illustrated by a black arrow. In a regeneration operation state of the high-temperature heat storage unit 640, the valve of the branching portion 752 operates so that the pipe 702 and the pipe 720 communicate with each other. The valve of the merging portion 772 operates so that the pipe 720 and the pipe 724 communicate with each other. In addition, in an example illustrated in FIG. 18, the sending of the cooling medium from the low-temperature chiller 620 is stopped.

The high-temperature chiller 610 is operating, and the warming medium sent from the high-temperature chiller 610 is supplied to the high-temperature heat storage unit 640 via the pipe 720 at the branching portion 752. The heat of the heating medium supplied to the high-temperature heat storage unit 640 is transferred to the heat storage unit 10 constituting the high-temperature heat storage unit 640, and the heat is stored in the heat storage material 200 of the heat storage unit 10, whereby the high-temperature heat storage unit 640 is regenerated.

Note that as described above, the flow rate can be controlled by adjusting the opening degree of the valve of the branching portion 752 and the valve of the merging portion 772. Specifically, the flow rate to the pipe 703 and the flow rate to the pipe 720 can be adjusted by communicating the pipe 702 with both the pipe 703 and the pipe 720 by the valve of the branching portion 752, and the flow rate from the pipe 710 and the flow rate from the pipe 720 can be adjusted by communicating both the pipe 710 and the pipe 720 with the pipe 724 by the valve of the merging portion 772. As described above, by appropriately controlling the flow rate of the pipe, the high-temperature heat storage unit 640 may be regenerated while heat exchange between the mixed medium and the workpiece is performed.

<<Regeneration Operation State of Heat Storage Unit for Low Temperature 650>>

As described above, in the normal operation state, the heat storage material 200 of the heat storage unit 10 constituting the low-temperature heat storage unit 650 is used to decrease the temperature of the reflux medium by performing heat exchange with the reflux medium having a decreased temperature. By the heat exchange with the reflux medium, heat is gradually stored in the heat storage material 200, and the temperature increases. When the temperature of heat storage material 200 increases, heat exchange with the reflux medium cannot be sufficiently performed, and it becomes difficult to decrease the temperature of the reflux medium. Therefore, when the temperature of heat storage material 200 increases, it is necessary to perform regeneration operation for taking heat from heat storage material 200. Here, the cooling medium sent from the low-temperature chiller 620 is supplied to the low-temperature heat storage unit 650 by switching a flow path of the cooling medium to take heat from the heat storage material 200 of the low-temperature heat storage unit 650, whereby the low-temperature heat storage unit 650 is regenerated.

FIG. 19 is a diagram illustrating a flow path for regenerating the low-temperature heat storage unit 650. Also in FIG. 19, a valve, a check valve, a pump, and the like are omitted for convenience. The opening and closing of the valve and the flow rate of the heating medium can be appropriately adjusted. A flow of heating medium is illustrated by a black arrow. In a regeneration operation state of the low-temperature heat storage unit 650, the valve of the branching portion 754 operates so that the pipe 704 and the pipe 722 communicate with each other. The valve of the merging portion 774 operates so that the pipe 722 and the pipe 726 communicate with each other. In addition, in an example illustrated in FIG. 19, the outflow of the warming medium from the high-temperature chiller 610 is stopped.

The low-temperature chiller 620 is operating, and the cooling medium sent from the low-temperature chiller 620 is supplied to the low-temperature heat storage unit 650 via the pipe 722 at the branching portion 754. Heat stored in the heat storage material 200 of the heat storage unit 10 constituting the low-temperature heat storage unit 650 is transferred to the cooling medium supplied to the low-temperature heat storage unit 650, and the heat is removed from the heat storage material 200, whereby the low-temperature heat storage unit 650 is regenerated.

Note that as described above, the flow rate can be controlled by adjusting the opening degree of the valve of the branching portion 754 and the valve of the merging portion 774. Specifically, the flow rate to the pipe 705 and the flow rate to the pipe 722 can be adjusted by communicating the pipe 704 with both the pipe 705 and the pipe 722 by the valve of the branching portion 754, and the flow rate from the pipe 714 and the flow rate from the pipe 722 can be adjusted by communicating both the pipe 714 and the pipe 722 with the pipe 726 by the valve of the merging portion 774. As described above, by appropriately controlling the flow rate of the pipe, the low-temperature heat storage unit 650 may be regenerated while heat exchange between the mixed medium and the workpiece is performed.

<<Function of Heat Storage Material 200 in Temperature Adjustment Device 600>>

In the temperature adjustment device 600, the heat storage material 200 is used as an auxiliary engine, whereby the temperature of the reflux medium can be adjusted without temperature adjustment through active control, and the temperature of the heating medium can be brought close to a desired temperature with a passive simple configuration.

<<<Form of Inorganic Fiber Sheet 100>>>

As described above, the inorganic fiber sheet 100 and the heat storage material 200 are provided. The heat storage unit 10 is arranged so as to be in contact with a member such as a pipe through which a heating medium and a cooling medium flows, and heat exchange is performed between a heating medium such as a warming medium and a cooling medium and the heat storage material 200 via the inorganic fiber sheet 100. As described above, the entire inorganic fiber sheet 100 has a flexible sheet-like (thin plate-like) form (see FIG. 1). Using the flexibility of the inorganic fiber sheet 100, the inorganic fiber sheet 100 can be configured by appropriately deforming according to the shape, size, and the like of the member such as a pipe to constitute the heat storage unit 10.

Hereinafter, the forms of only the inorganic fiber sheet 100 will be described. Note that in the case of configuring the heat storage unit 10, the inorganic fiber sheet 100 and the heat storage material 200 is configured to be in contact with each other in combination with the embedded type, the impregnated type, the supported type, the layered type, and the like described above.

<<Flat Shape>>

Figure 20:
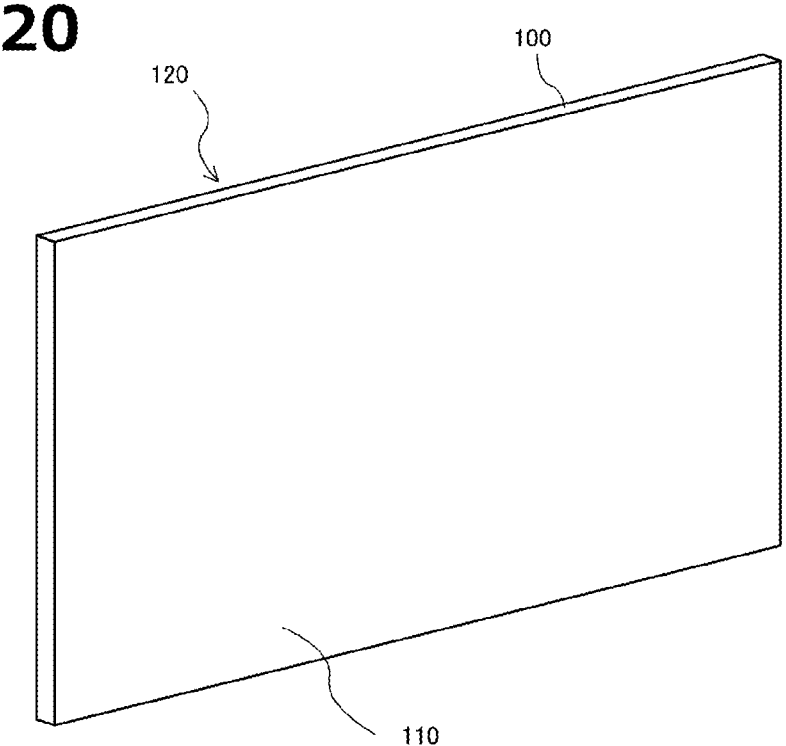
FIG. 20 is a perspective view illustrating a state in which the inorganic fiber sheet 100 is made in a flat shape.

FIG. 20 is a perspective view illustrating a state in which the inorganic fiber sheet 100 is made in a flat shape. The flat shape can be used, for example, in cases such as a case where an outer surface of a top plate, a bottom plate, or the like of the member such as a pipe has a flat surface. By spreading (extending) the inorganic fiber sheet 100 along a flat surface, the inorganic fiber sheet 100 can be deformed into a flat shape and arranged on a member such as a top plate and a bottom plate. Note that the shape of the member such as a pipe may be not only a completely flat shape but also a gently curved shape.

Even in a case where the inorganic fiber sheet 100 is made in a flat shape and used, the heat storage material 200 may be arranged in and brought into contact with a region inside the inorganic fiber sheet 100, or may be arranged on and brought into contact with the first surface 110 or the second surface 120 of the inorganic fiber sheet 100. For example, the heat storage material 200 may be arranged between the member such as a pipe and the inorganic fiber sheet 100. In addition, the heat storage material 200 may be arranged at a position separated from the member such as a pipe.

<<Uneven Shape>>

Figure 21:
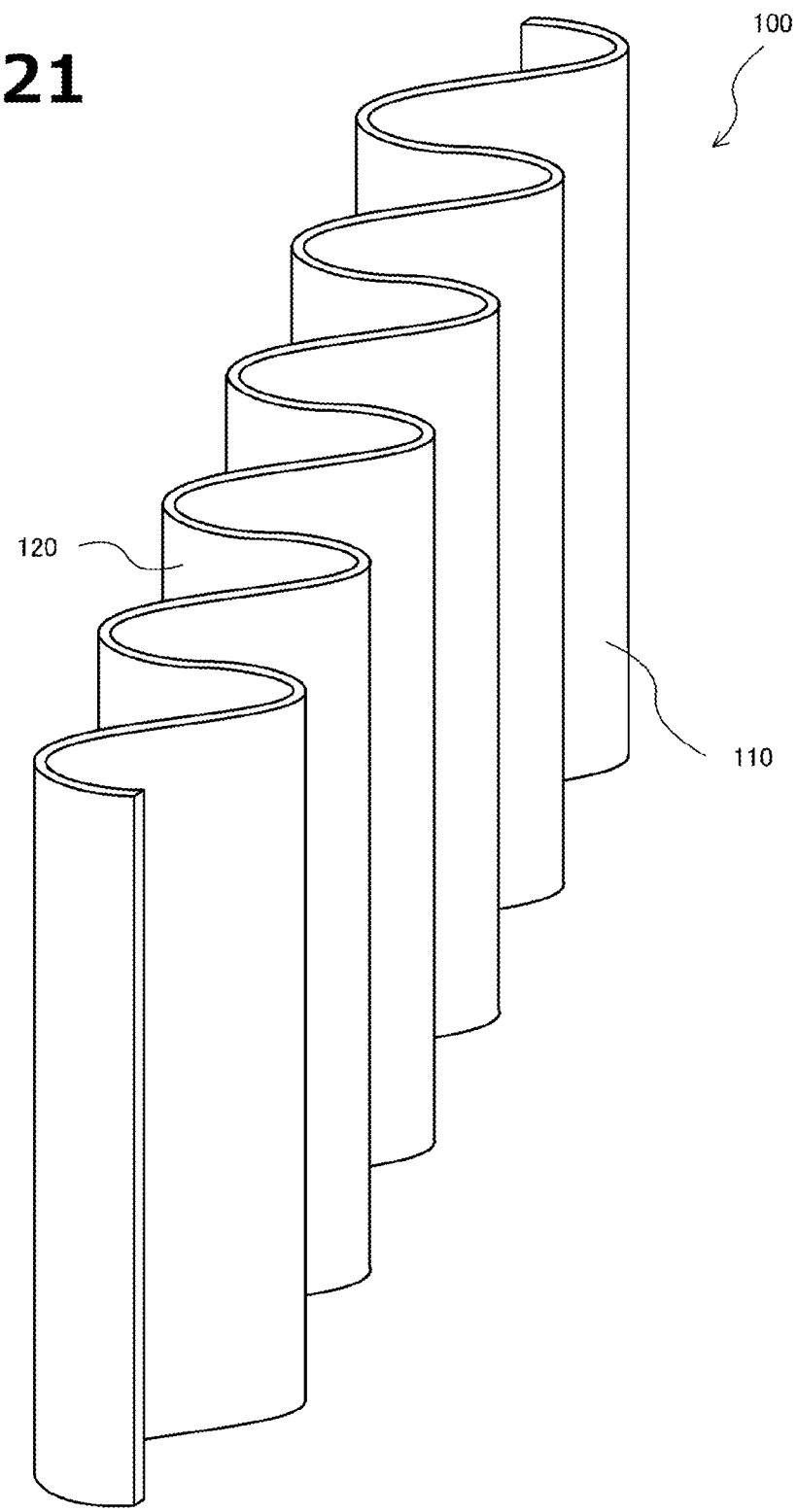
FIG. 21 is a perspective view illustrating a state in which the inorganic fiber sheet 100 is deformed so that unevenness is repeated.

FIG. 21 is a perspective view illustrating a state in which the inorganic fiber sheet 100 is deformed so that unevenness is repeated. For example, the uneven shape can be used in a case where the heat storage unit 10 is attached to a member processed into a corrugated shape in which a curved recess and a curved protrusion are repeated or the like. The inorganic fiber sheet 100 is attached while being gradually deformed (extended) along a curved uneven surface, whereby the inorganic fiber sheet 100 can be deformed into an uneven shape and arranged on the member.

Figure 22:
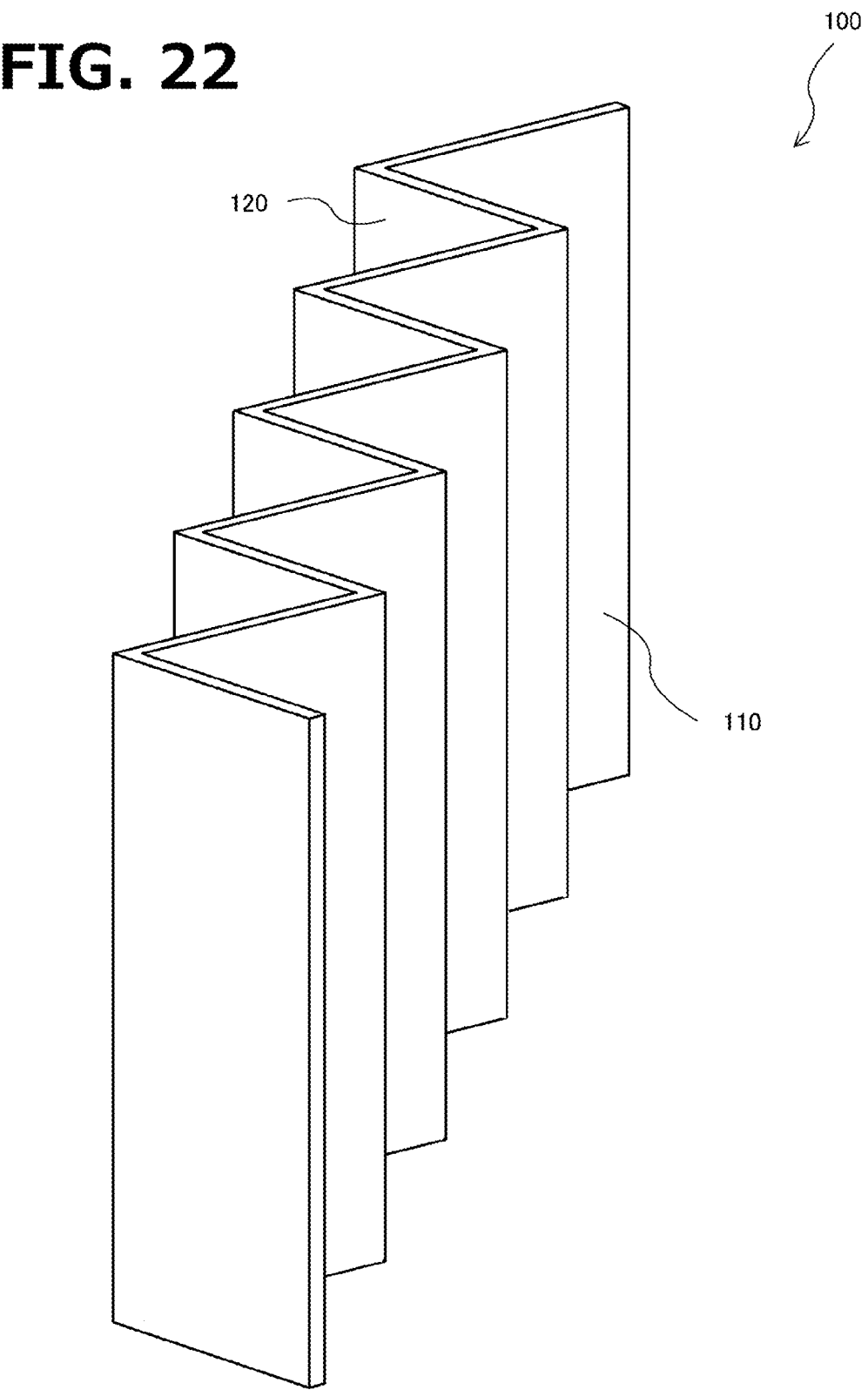
FIG. 22 is a perspective view illustrating the inorganic fiber sheet 100 having a cross-section bent so as to repeat a V shape and an inverted V shape.
Figure 23:
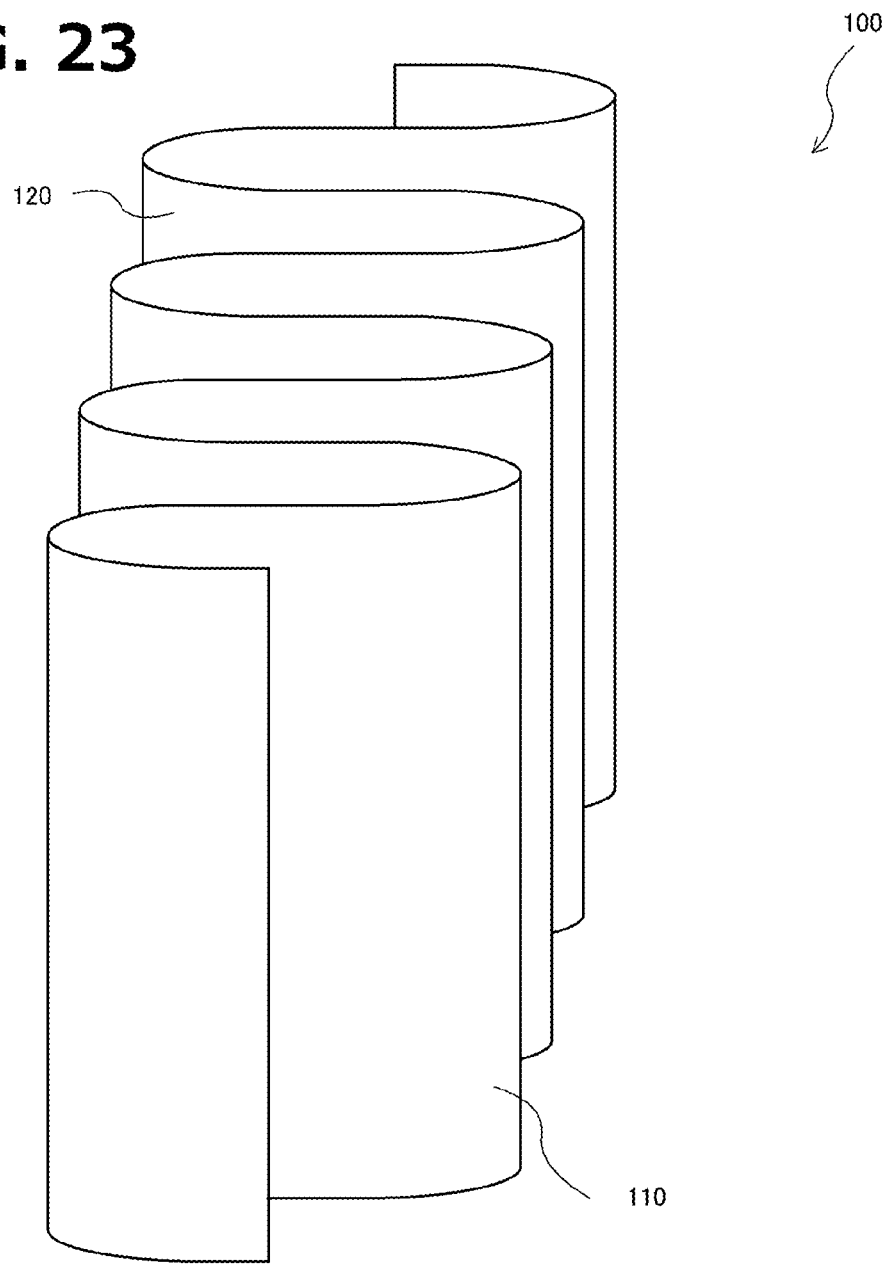
FIG. 23 is a perspective view illustrating the inorganic fiber sheet 100 having a cross section bent so as to repeat a U-shape and an inverted U-shape.

Note that the uneven shape may be not only a shape constituted by a gentle curved surface like a corrugated shape illustrated in FIG. 21, but also a shape in which a cross section is bent so as to repeat a V-shape and an inverted V-shape as illustrated in FIG. 22. Furthermore, as illustrated in FIG. 23, the uneven shape may include not only a curved surface but also a flat surface. Note that in FIG. 23, the thickness of the inorganic fiber sheet 100 is omitted. The shape illustrated in FIG. 23 is a shape in which a cross section is curved so as to repeat a U-shape and an inverted U-shape, and is formed so that adjacent plane portions are parallel to each other. The adjacent plane portions have a layered structure. In this way, in a case where a layered structure as illustrated in FIG. 23 is formed, the layered structure can be configured by processing a single inorganic fiber sheet 100, and a configuration can be simplified and a manufacturing process can be simplified.

Even in a case where the inorganic fiber sheet 100 is deformed into an uneven shape, the heat storage material 200 may be arranged in and brought into contact with a region inside the inorganic fiber sheet 100, or may be arranged on and brought into contact with the first surface 110 or the second surface 120 of the inorganic fiber sheet 100. Also in this case, for example, the heat storage material 200 can be arranged between the member such as a pipe and the inorganic fiber sheet 100. In addition, the heat storage material 200 may be arranged at a position separated from the member such as a pipe.

<<Spiral Shape>>

Figure 24:
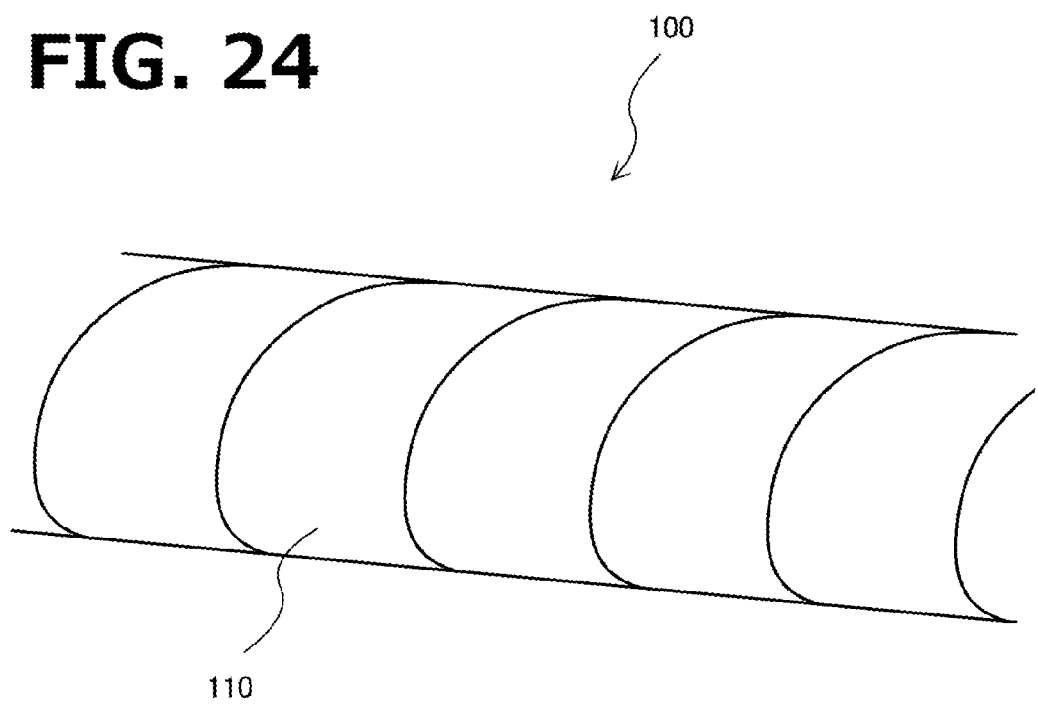
FIG. 24 is a perspective view illustrating a state in which an elongated inorganic fiber sheet 100 is deformed into a spiral shape.

FIG. 24 is a perspective view illustrating a state in which an elongated inorganic fiber sheet 100 is deformed into a spiral shape. Note that in FIG. 24, the thickness of the inorganic fiber sheet 100 is omitted. For example, the spiral shape can be used in a case where the inorganic fiber sheet 100 is wound around an elongated member such as a pipe. By gradually displacing the inorganic fiber sheet along the longitudinal direction of the pipe while winding the inorganic fiber sheet 100 along the periphery of the pipe, the inorganic fiber sheet 100 can be deformed in a spiral shape and arranged on the pipe. Note that the elongated member may have a shape extending linearly along the longitudinal direction, a curved shape, or a bent shape.

Even in a case where the inorganic fiber sheet 100 is deformed into a spiral shape, the heat storage material 200 may be arranged in and brought into contact with a region inside the inorganic fiber sheet 100, or may be arranged on and brought into contact with the first surface 110 or the second surface 120 of the inorganic fiber sheet 100. Also in this case, for example, the heat storage material 200 can be arranged between the member such as a pipe and the inorganic fiber sheet 100. In addition, the heat storage material 200 may be arranged at a position separated from the member such as a pipe.

<<Scroll Shape (Spring Spiral Shape)>>

Figure 25:
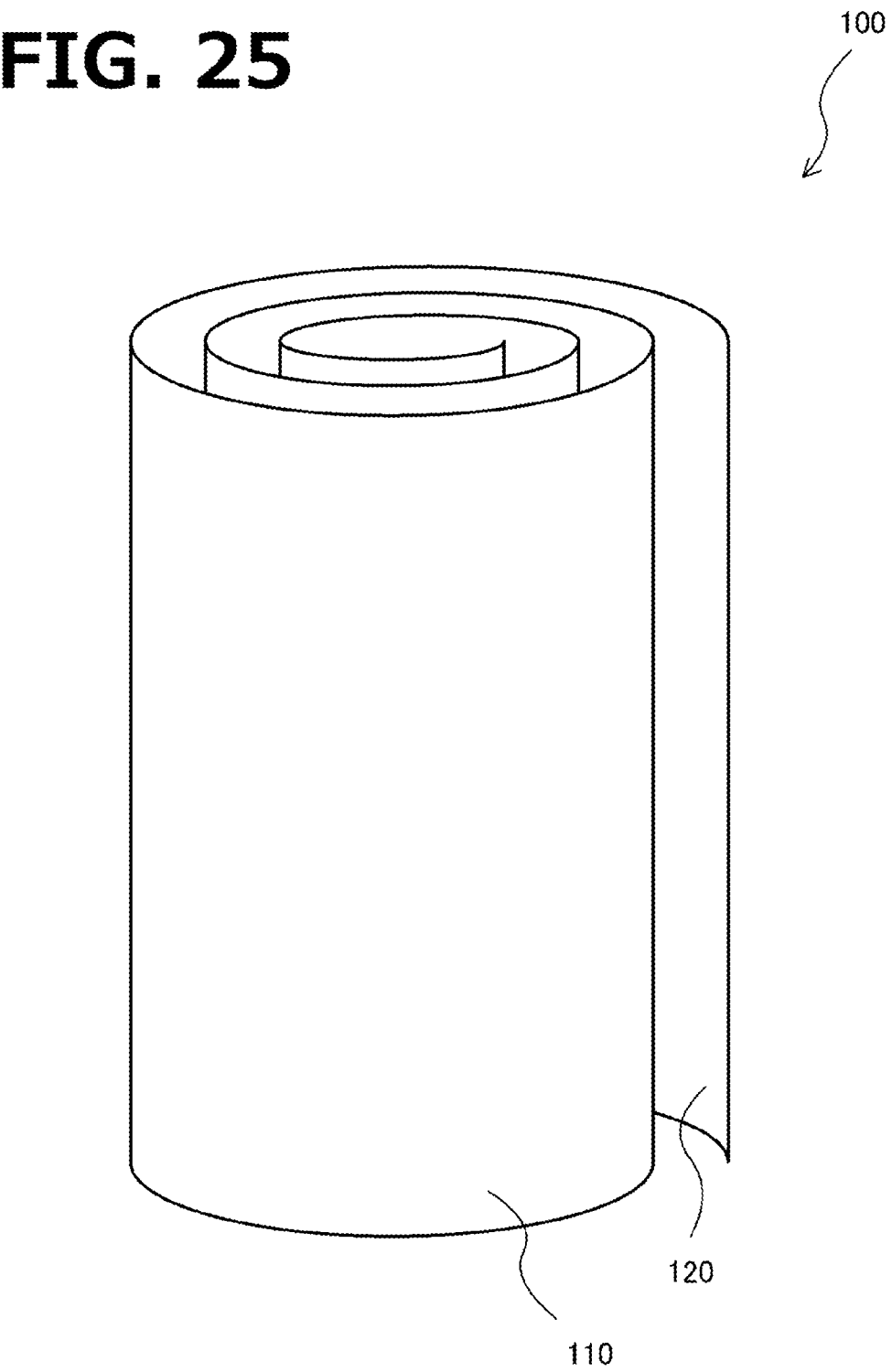
FIG. 25 is a perspective view illustrating a state in which the inorganic fiber sheet 100 is deformed into a scroll shape (spiral spring shape).

FIG. 25 is a perspective view illustrating a state in which the inorganic fiber sheet 100 is deformed into a scroll shape (spiral spring shape). Note that in FIG. 25, the thickness of the inorganic fiber sheet 100 is omitted. For example, the inorganic fiber sheet 100 can be deformed by being wound around an elongated member such as a pipe with the pipe as the center so that a radius gradually increases, and arranged around the pipe. The spiral shape described above is formed by gradually displacing the inorganic fiber sheet 100 along the longitudinal direction of the pipe while winding the inorganic fiber sheet 100 along the periphery of the pipe, but the scroll shape can be formed by winding the inorganic fiber sheet 100 without displacing the inorganic fiber sheet 100 in the longitudinal direction.

Even in a case where the inorganic fiber sheet 100 is deformed into a scroll shape, the heat storage material 200 may be arranged in and brought into contact with a region inside the inorganic fiber sheet 100, or may be arranged on and brought into contact with the first surface 110 or the second surface 120 of the inorganic fiber sheet 100. Also in this case, for example, the heat storage material 200 can be arranged between the member such as a pipe and the inorganic fiber sheet 100. In addition, the heat storage material 200 may be arranged at a position separated from the member such as a pipe. In particular, the heat storage material 200 can also be arranged in a region between the inorganic fiber sheets 100 wound around a pipe and adjacent to each other. With such a configuration, the entire amount of the heat storage material 200 can be increased.

<<Layered Shape>>

Figure 26:
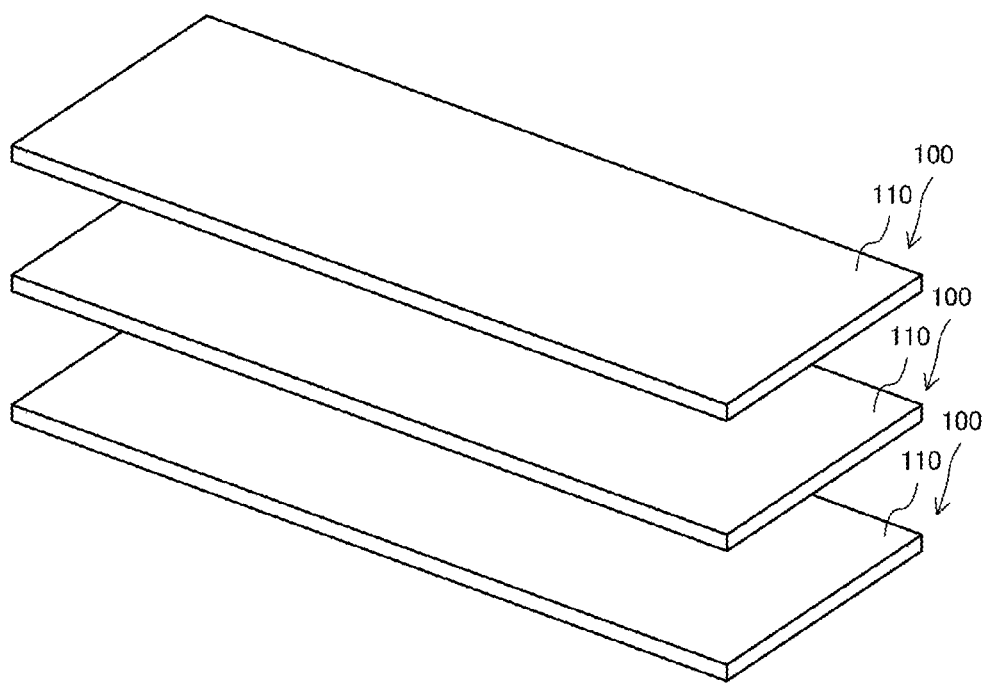
FIG. 26 is a perspective view illustrating a state in which a plurality of inorganic fiber sheets 100 is made in a layered shape by being arranged substantially in parallel while being separated from each other.

FIG. 26 is a perspective view illustrating a state in which a plurality of inorganic fiber sheets 100 is made in a layered shape by being arranged substantially in parallel while being separated from each other. The layered shape can be used, for example, in cases such as a case where the heat storage unit 10 is attached to a member having a flat surface such as a top plate and a bottom plate. A plurality of inorganic fiber sheets 100 can be formed in a layered shape on a flat surface of a top plate, a bottom plate, or the like by layering the plurality of inorganic fiber sheets 100. In the case of forming in a layered shape, the heat storage material 200 can also be arranged between the adjacent inorganic fiber sheets 100, and the overall amount of the heat storage material 200 can be increased. In addition, since the plurality of inorganic fiber sheets 100 is arranged substantially in parallel, it is easy to align a temperature distribution of the heat storage material 200 arranged between the adjacent inorganic fiber sheets 100 (in-plane temperature distribution of the inorganic fiber sheet 100), and every corner of the heat storage material 200 can be effectively utilized.

Even in a case where the inorganic fiber sheet 100 is formed in a layered shape, the heat storage material 200 may be arranged in and brought into contact with a region inside the inorganic fiber sheet 100, or may be arranged on and brought into contact with the first surface 110 or the second surface 120 of the inorganic fiber sheet 100. Also in this case, for example, the heat storage material 200 can be arranged between the member such as a pipe and the inorganic fiber sheet 100. In addition, the heat storage material 200 may be arranged at a position separated from the member such as a pipe.

Note that it is sufficient that a plurality of inorganic fiber sheets 100 can be arranged substantially in parallel while being separated from each other, and not only a plurality of inorganic fiber sheets 100 can be made in a flat shape, but also a plurality of inorganic fiber sheets 100 can be curved and layered while being kept in parallel.

<<<Form of Inorganic Fiber Sheet 100, Type of Contact of Heat Storage Material 200, and Heat Transfer>>>

Although the flat shape, the uneven shape, the spiral shape, the scroll shape (spiral spring shape), and the layered shape have been described as the forms of the inorganic fiber sheet 100, each of these shapes is an example, and forms such as the shape and arrangement of the inorganic fiber sheet 100 can be appropriately determined according to the shape, size, and the like of the member such as a pipe through which a heating medium or a cooling medium flows. As described above, the form of only the inorganic fiber sheet 100 have been described, but the heat storage unit 10 is configured so that the heat storage material 200 is in contact with the inorganic fiber sheet 100 by appropriately selecting the type of contact such as the embedded type, the impregnated type, the supported type, and the layered type described above according to the form of the inorganic fiber sheet 100.

As described above, in the heat storage unit 10, heat introduced from the outside of the heat storage unit 10 is transferred to the heat storage material 200 via the inorganic fiber sheet 100. In addition, the heat stored in the heat storage material 200 is led out to the outside of the heat storage unit 10 via the inorganic fiber sheet 100. As described above, heat is introduced or led out via the inorganic fiber sheet 100. As described above, by appropriately determining the size and shape of the inorganic fiber sheet 100 and appropriately determining a position at which the inorganic fiber sheet 100 is arranged, a contact state between the inorganic fiber sheet 100 and the heat storage material 200 can be made into a suitable state.

In the heat storage unit 10, by appropriately distributing the inorganic fiber sheet 100, heat transferred from the outside to the heat storage unit 10 can be dispersed by the inorganic fiber sheet 100 and uniformly transferred to the heat storage material 200. In addition, the heat stored in the heat storage material 200 can be uniformly collected on the inorganic fiber sheet from everywhere of the heat storage material 200 and transferred to the outside of the heat storage unit 10. For example, the inorganic fiber sheet 100 can be arranged to be isotropically distributed. In this way, heat can be efficiently absorbed and stored by the heat storage material 200, and heat can be taken out from the heat storage material 200 and supplied to the outside.

Figure 27:
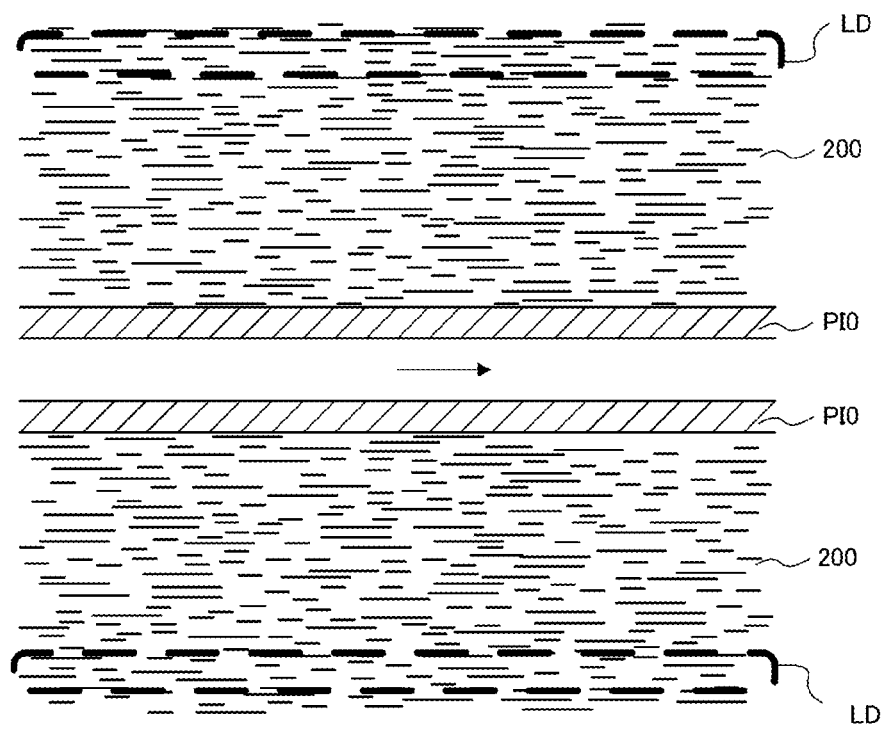
FIG. 27 is a cross-sectional view illustrating a state in which the heat storage material 200 is arranged around a pipe PI0.

In addition, it may be necessary to increase the amount of heat storage material 200 in order to increase the amount of heat that can be exchanged. As illustrated in FIG. 27, in a case where the amount of the heat storage material 200 is increased, it is necessary to arrange the heat storage material 200 up to a position LD far from a pipe PI0. When the heat storage material 200 is configured in this way, it is assumed that it takes time to transfer heat to the heat storage material 200 located at the position LD far from the pipe PI0 and it takes time to extract heat from the heat storage material 200 located at the position LD far from the pipe PI0. In this case, it becomes difficult to transfer heat to the entire heat storage material 200 or to take out heat from the entire heat storage material 200, and responsiveness of heat exchange deteriorates. Thus, even if the amount of the heat storage material 200 is increased, the entire heat storage material 200 may not be sufficiently utilized.

Figure 28:
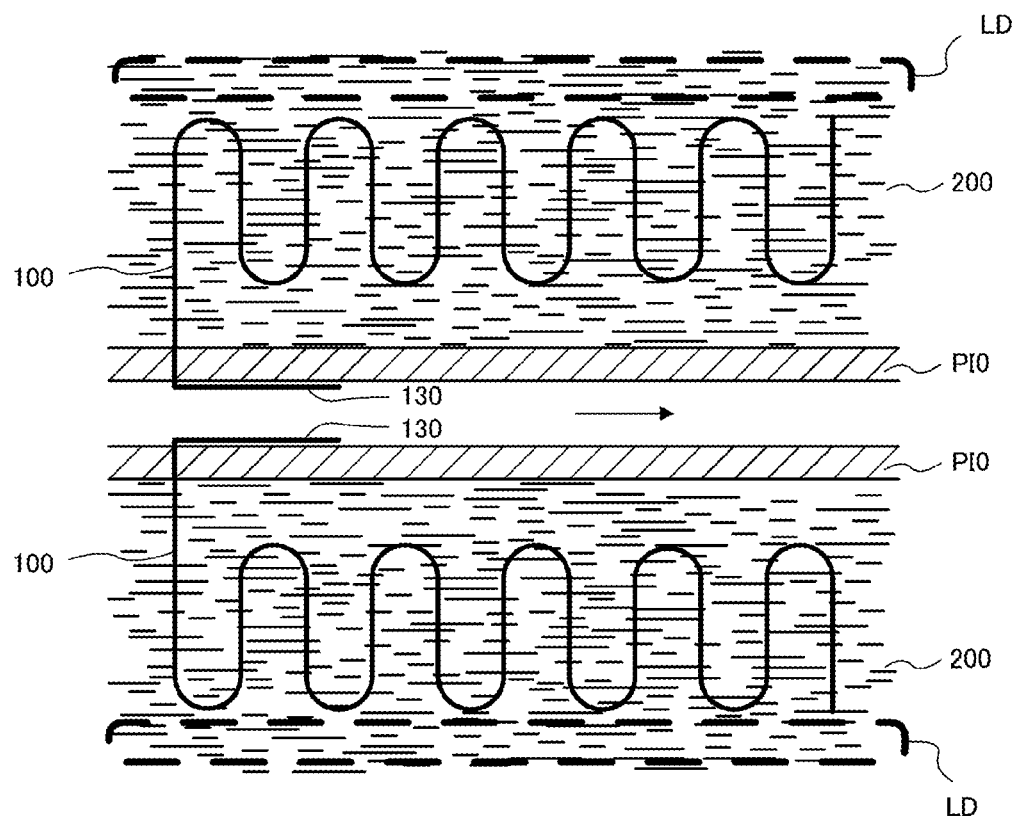
FIG. 28 is a cross-sectional view illustrating a state in which the inorganic fiber sheet 100 and the heat storage material 200 are arranged around the pipe PI0.

Therefore, as illustrated in FIG. 28, by arranging the inorganic fiber sheet 100 to reach every corner of the heat storage material 200, heat can be quickly transferred to the heat storage material 200 located at the position LD far from the pipe PI0, and heat can be quickly taken out from the heat storage material 200 located at the position LD far from the pipe PI0. In an example illustrated in FIG. 28, the inorganic fiber sheet 100 in an uneven shape and having a layered structure illustrated in FIG. 23 is used. By using the inorganic fiber sheet 100 in an uneven shape and having a layered structure, heat change can be uniformly performed throughout the entire heat storage material 200. Note that not only the inorganic fiber sheet 100 in an uneven shape illustrated in FIG. 23 but also an inorganic fiber sheet 100 of another form can be used. The form of the inorganic fiber sheet 100 is appropriately determined according to the shape, size, and the like of the member such as a pipe to which the heat storage unit 10 is attached, the types, flow velocities, and the like of the heating medium and the cooling medium, the amount of the heat storage material 200, and the like.

In addition, as illustrated in FIG. 28, the inorganic fiber sheet 100 has a guiding end 130. The inorganic fiber sheet 100 is integrally formed including the guiding end 130, and can transfer heat. The guiding end 130 of the inorganic fiber sheet 100 is arranged inside the pipe PI0. In this way, the heat of the cooling medium flowing through the pipe PI0 can be easily transferred to the heat storage material 200, and the heat stored in the heat storage material 200 can be easily transferred to the heating medium flowing through the pipe PI0.

<<<Housing 300>>>

As described above, the heat storage unit 10 may have the housing 300. In a case where the heat storage unit 10 has the housing 300, the inorganic fiber sheet 100 and the heat storage material 200 are housed in the housing 300. Note that it is preferable that part of the inorganic fiber sheet 100 extends and is exposed from the housing 300. An extending portion and an exposed portion of the inorganic fiber sheet 100 are used for conduction of heat between the heat storage unit 10 and the outside. For example, the outside includes a heating medium (heating medium) such as a warming medium and a cooling medium flowing through a pipe.

In a case where the heat storage material 200 is a substance that undergoes a solid-solid phase transition, the housing 300 is not required because the heat storage material 200 always has a constant shape. Meanwhile, in a case where the heat storage material 200 is a substance that undergoes a solid-liquid phase transition, the housing 300 is required because when the heat storage material 200 is in a liquid state, the heat storage material 200 cannot maintain a certain shape. Note that even in a case where the heat storage material 200 is a substance that undergoes a solid-solid phase transition, the inorganic fiber sheet 100 and the heat storage material 200 may be configured to be housed in housing 300. By housing the heat storage material 200 in the housing 300, it is possible to maintain a contact state between an inorganic fiber sheet 100 and the heat storage material 200 and to stabilize thermal conductivity by preventing breakage and contamination.

<<Configuration of Housing 300>>

Figure 29:
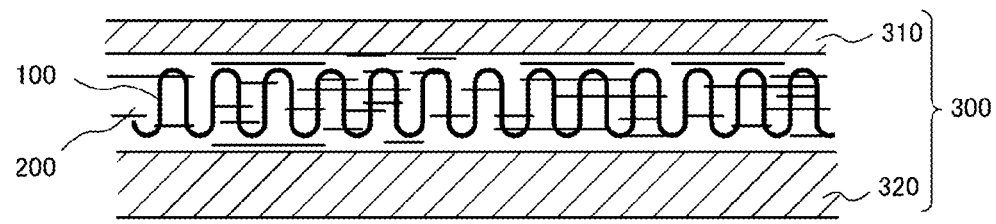
FIG. 29 is a cross-sectional view illustrating part of a housing 300.

FIG. 29 is a cross-sectional view illustrating part of the housing 300. As illustrated in FIG. 29, the housing 300 has a copper foil 302 and a copper plate 304. The copper foil 302 and the copper plate 304 function as a case body of the housing 300. The copper foil 302 and the copper plate 304 include copper and have a substantially flat shape (substantially flat plate shape). The copper foil 302 and the copper plate 304 are arranged while being separated from and parallel to each other, and the inorganic fiber sheet 100 and the heat storage material 200 are arranged between the copper foil 302 and the copper plate 304. The inorganic fiber sheet 100 and the heat storage material 200 are sandwiched between the copper foil 302 and the copper plate 304. Note that in an example illustrated in FIG. 29, the copper foil 302 forms an upper surface, and the copper plate 304 forms a lower surface.

When heat is transferred from the outside of the heat storage unit 10 to the copper foil 302 and the copper plate 304, the heat can be transferred to the heat storage material 200 via the inorganic fiber sheet 100 and stored. In addition, when heat is stored in the heat storage material 200, the heat can be transferred to the copper foil 302 and the copper plate 304 via the inorganic fiber sheet 100 and output to the outside of the heat storage unit 10.

Figure 30:
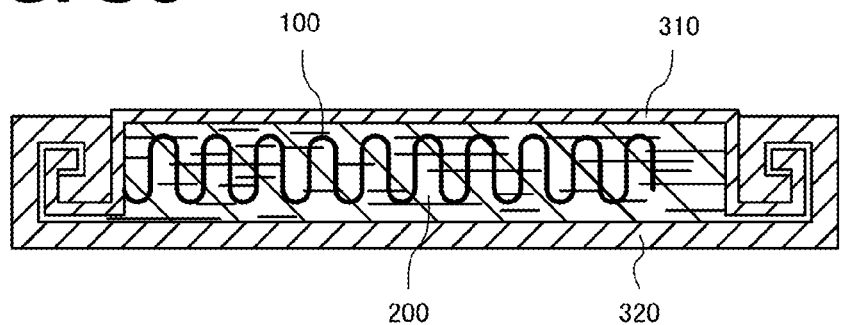
FIG. 30 is a cross-sectional view illustrating a configuration of the housing 300.

FIG. 30 is a cross-sectional view illustrating a configuration of the housing 300. As illustrated in FIG. 30, ends of the copper foil 302 and the copper plate 304 facing each other can be joined. By the joining, the copper foil 302 and the copper plate 304 can be sealed, and the heat storage material 200 can be prevented from being leaked even if the heat storage material 200 is liquefied. For the joining, a method such as caulking and welding can be used. By joining the copper foil 302 and the copper plate 304, the inorganic fiber sheet 100 and the heat storage material 200 can be enclosed.

In an example described above, the copper foil 302 is used as the upper surface and the copper plate 304 is used as the lower surface, but the copper foil 302 and the copper plate 304 are not limited to those made of copper, and other metal such as stainless steel, carbon, graphite, and the like may be used. In addition, the copper foil 302 and the copper plate 304 made of copper are made of copper and have different thicknesses. The housing 300 may be configured using only the copper foil 302, or the housing 300 may be configured using only the copper plate 304.

Modification 1

As described above, a heat storage unit 10 (high-temperature heat storage unit 640, low-temperature heat storage unit 650, and the like) performs heat exchange with the heating medium. In order to enhance the efficiency of heat exchange, a heat insulating material can be used. For example, by covering the heat storage unit 10 with a heat insulator including a heat insulating material having a shape and a size for covering the entire heat storage unit 10, it is possible to prevent heat from being transferred to other than a heat storage material 200 and a warming medium, and it is possible to enhance the efficiency of heat exchange between the heat storage material 200 and the warming medium. By using the heat insulating material, the heating medium can be quickly brought close to a desired temperature, and the heat storage material 200 can be quickly regenerated.

Details of Present Embodiments

As described above, the present invention has been described according to the present embodiments, but it should not be understood that the description and drawings constituting a part of this disclosure limit this invention. As described above, it is a matter of course that the present invention includes various embodiments and the like not described herein.

REFERENCE SIGNS LIST

10 Heat storage unit
100 Inorganic fiber sheet
102 Inorganic fiber
200 Heat storage material
300 Housing
600 Temperature adjustment device
610 High-temperature chiller
620 Low-temperature chiller
630 Workpiece temperature control unit
640 High-temperature heat storage unit
650 Low-temperature heat storage unit

The invention claimed is:

1. A heat storage unit used in a heat exchange device, wherein
the heat exchange device further includes:
a temperature adjustment unit that adjusts a temperature of an object to be installed thereinside;
a heating medium supply unit that is directly connected to the heat storage unit and to which the heating medium led out from the heat storage unit is supplied, wherein the heating medium supply unit is configured to adjust a temperature of the heating medium supplied thereto to a predetermined temperature;
a first supply flow path that connects the heating medium supply unit to the temperature adjustment unit, and supplies the heating medium led out from the heating medium supply unit to the temperature adjustment unit;
a return flow path that connects the temperature adjustment unit to the heating medium supply unit through the heat storage unit, and returns the heating medium led out from the temperature adjustment unit to the heating medium supply unit such that an operation circulation is completed through which the heating medium circulates passing through the heating medium supply unit, the temperature adjustment unit and the heat storage unit;
a second supply flow path that connects the heating medium supply unit to the heat storage unit such that a reproduction circulation is completed through which the heating medium led out from the heating medium supply unit is directly supplied to the heat storage unit without passing through the temperature adjustment unit, then returning to the heating medium supply unit; and
a flow path forming unit that is placed in the first supply flow path, and is configured to switch a flow of the heating medium either to the first supply flow path or to the second supply flow path, and
the heat storage unit includes:
at least one inorganic fiber body configured by binding metal fibers and having a desired shape;
a heat storage material formed in contact with the metal fibers, and
the metal fibers are made of either a single metal or an alloy, the single metal being selected from a group consisting of copper, silver, gold, platinum, aluminum, nickel, chromium, and tungsten, and the alloy being selected from a group consisting of stainless steel, a copper alloy, a tungsten alloy, and a chromium alloy, wherein when the heating medium flows in the first supply flow path by the flow path forming unit, the temperature of the heating medium is brought close to the predetermined temperature by heat exchange between the heat storage material and the heating medium, and when the heating medium flows in the second supply flow path by the flow path forming unit, the heat storage material is regenerated by heat exchange between the heat storage material and the heating medium.

2. The heat storage unit according to claim 1, wherein in a case where the heating medium is a warming medium, when the warming medium flows in the first supply flow path and the return flow path, heat is transferred from the heat storage material to the warming medium so that the temperature of the warming medium is increased and brought close to the predetermined temperature, and when the warming medium flows in the second supply flow path, heat is transferred from the warming medium to the heat storage material so that a temperature of the heat storage material is increased, the heat storage material is regenerated, and the temperature of the warming medium decreases.

3. The heat storage unit according to claim 1, wherein in a case where the heating medium is a cooling medium, when the cooling medium flows in the first supply flow path and the return flow path, heat is transferred from the cooling medium to the heat storage material so that the temperature of the cooling medium is decreased and brought close to the predetermined temperature, and when the cooling medium flows in the second supply flow path, heat is transferred from the heat storage material to the cooling medium so that a temperature of the heat storage material is decreased, the heat storage material is regenerated, and the temperature of the cooling medium increases.

\* \* \* \* \*